United States Patent
Konishi et al.

(10) Patent No.: US 10,477,074 B2
(45) Date of Patent: Nov. 12, 2019

(54) COLOR ADJUSTMENT DETERMINATION METHOD AND INFORMATION PROCESSING APPARATUS

(71) Applicants: Yohsuke Konishi, Kanagawa (JP); Yoko Ishii, Kanagawa (JP)

(72) Inventors: Yohsuke Konishi, Kanagawa (JP); Yoko Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/254,784

(22) Filed: Jan. 23, 2019

(65) Prior Publication Data
US 2019/0158705 A1 May 23, 2019

Related U.S. Application Data

(63) Continuation of application No. 15/665,525, filed on Aug. 1, 2017, now Pat. No. 10,230,872.

(51) Int. Cl.
| | |
|---|---|
| *H04N 1/60* | (2006.01) |
| *B41J 2/21* | (2006.01) |
| *G01J 3/50* | (2006.01) |
| *G01J 3/46* | (2006.01) |

(52) U.S. Cl.
CPC ............. *H04N 1/6008* (2013.01); *B41J 2/21* (2013.01); *B41J 2/2146* (2013.01); *G01J 3/506* (2013.01); *H04N 1/6041* (2013.01); *G01J 3/462* (2013.01); *G01J 3/463* (2013.01); *G01J 2003/466* (2013.01)

(58) Field of Classification Search
CPC ....... H04N 1/6008; H04N 1/6041; B41J 2/21; B41J 3/506; G01J 3/462; G01J 3/463; G01J 2003/466
See application file for complete search history.

(56) References Cited

U.S. PATENT DOCUMENTS

| | | | |
|---|---|---|---|
| 8,926,043 B2 * | 1/2015 | Mizutani | B41J 2/1753 347/14 |
| 2013/0135634 A1 | 5/2013 | Li | |
| 2015/0077453 A1 * | 3/2015 | Nakamura | B41J 2/1433 347/12 |
| 2017/0034393 A1 | 2/2017 | Hasegawa et al. | |

FOREIGN PATENT DOCUMENTS

JP 2011-199409 10/2011

* cited by examiner

*Primary Examiner* — Quang N Vo
(74) *Attorney, Agent, or Firm* — IPUSA, PLLC

(57) ABSTRACT

A color adjustment determination method is provided that includes forming a color adjustment image on a recording medium by moving a plurality of heads including a plurality of nozzles relative to the recording medium in a relative moving direction and ejecting liquid from the plurality of heads that are arranged in an orthogonal direction orthogonal to the relative moving direction, acquiring colorimetric values of a plurality of portions of the color adjustment image formed by the plurality of heads that are arranged at different positions in the orthogonal direction, calculating a color difference between at least two portions of the plurality of portions of the color adjustment image based on the colorimetric values of the plurality of portions, and determining whether at least one of the plurality of heads that have ejected the liquid requires adjustment based on the calculated color difference.

15 Claims, 17 Drawing Sheets

ORIGINAL IMAGE DATA (GRADATION DATA)

COLOR ADJUSTMENT IMAGE
(COLOR ADJUSTMENT GRADATION CHART)

COLOR CHECKING IMAGE
(COLOR CHECKING GRADATION CHART)

FIG.10

MEASURED VALUE

| HEAD COLUMN | POSI-TION | HEAD | GRADA-TION | L* | a* | b* | K | C | M | Y |
|---|---|---|---|---|---|---|---|---|---|---|
| HC1 | LEFT | K | 100% | 11.50 | −0.28 | −2.36 | 1.881 | 1.898 | 1.864 | 1.813 |
| | | | 60% | ... | ... | ... | ... | ... | ... | ... |
| | | | 30% | | | | | | | |
| | | C | 100% | | | | | | | |
| | | | 60% | | | | | | | |
| | | | 30% | | | | | | | |
| | | M | 100% | | | | | | | |
| | | | 60% | | | | | | | |
| | | | 30% | | | | | | | |
| | | Y | 100% | | | | | | | |
| | | | 60% | | | | | | | |
| | | | 30% | | | | | | | |
| | MIDDLE | K | 100% | | | | | | | |
| | | | 60% | | | | | | | |
| | | | 30% | | | | | | | |
| | | C | 100% | | | | | | | |
| | | | 60% | | | | | | | |
| | | | 30% | | | | | | | |
| | | M | 100% | | | | | | | |
| | | | 60% | | | | | | | |
| | | | 30% | | | | | | | |
| | | Y | 100% | | | | | | | |
| | | | 60% | | | | | | | |
| | | | 30% | | | | | | | |
| | RIGHT | K | 100% | | | | | | | |
| | | | 60% | | | | | | | |
| | | | 30% | | | | | | | |
| | | C | 100% | | | | | | | |
| | | | 60% | | | | | | | |
| | | | 30% | | | | | | | |
| | | M | 100% | | | | | | | |
| | | | 60% | | | | | | | |
| | | | 30% | | | | | | | |
| | | Y | 100% | | | | | | | |
| | | | 60% | | | | | | | |
| | | | 30% | | | | | | | |

FIG.11A

HEAD-TO-HEAD COLOR DIFFERENCE

|   | H1-2 | H2-3 | H3-4 | H4-5 |
|---|---|---|---|---|
| K | 1.38 | 1.00 | 0.24 | 0.92 |
| C | 1.06 | 1.07 | 1.18 | 1.85 |
| M | 0.35 | 0.52 | 0.07 | 0.89 |
| Y | 2.12 | 1.14 | 0.62 | 1.33 |

FIG.11B

DENSITY DIFFERENCE BETWEEN AVERAGE DENSITY AND DENSITY OF EACH HEAD

|   | H1 | H2 | H3 | H4 | H5 |
|---|---|---|---|---|---|
| K | 0.012 | 0.078 | 0.032 | 0.020 | −0.022 |
| C | 0.028 | 0.069 | 0.021 | 0.021 | −0.022 |
| M | 0.027 | 0.024 | −0.003 | −0.007 | −0.021 |
| Y | 0.002 | 0.018 | 0.018 | 0.005 | −0.025 |

FIG.11C

ADJUSTMENT VALUE SET UP FOR ADJUSTMENT TARGET HEAD

|   | H1 | H2 | H3 | H4 | H5 |
|---|---|---|---|---|---|
| K |  |  |  |  |  |
| C |  |  |  |  | +1 |
| M |  |  |  |  |  |
| Y |  | −1 |  |  |  |

FIG.15

MEASURED VALUE

| HEAD COLUMN | POSI-TION | COLOR | GRADA-TION | L* | a* | b* | K | C | M | Y |
|---|---|---|---|---|---|---|---|---|---|---|
| HC1 | LEFT | R | 60% | 51.95 | 59.01 | 45.68 | 0.591 | 0.257 | 1.102 | 1.305 |
| | | | 30% | ... | ... | ... | ... | ... | ... | ... |
| | | G | 60% | | | | | | | |
| | | | 30% | | | | | | | |
| | | B | 60% | | | | | | | |
| | | | 30% | | | | | | | |
| | MIDDLE | R | 60% | | | | | | | |
| | | | 30% | | | | | | | |
| | | G | 60% | | | | | | | |
| | | | 30% | | | | | | | |
| | | B | 60% | | | | | | | |
| | | | 30% | | | | | | | |
| | RIGHT | R | 60% | | | | | | | |
| | | | 30% | | | | | | | |
| | | G | 60% | | | | | | | |
| | | | 30% | | | | | | | |
| | | B | 60% | | | | | | | |
| | | | 30% | | | | | | | |
| HC2 | LEFT | R | 60% | | | | | | | |
| | | | 30% | | | | | | | |
| | | G | 60% | | | | | | | |
| | | | 30% | | | | | | | |
| | | B | 60% | | | | | | | |
| | | | 30% | | | | | | | |
| | MIDDLE | R | 60% | | | | | | | |
| | | | 30% | | | | | | | |
| | | G | 60% | | | | | | | |
| | | | 30% | | | | | | | |
| | | B | 60% | | | | | | | |
| | | | 30% | | | | | | | |
| | RIGHT | R | 60% | | | | | | | |
| | | | 30% | | | | | | | |
| | | G | 60% | | | | | | | |
| | | | 30% | | | | | | | |
| | | B | 60% | | | | | | | |
| | | | 30% | | | | | | | |

FIG.16A

COLOR DIFFERENCE BETWEEN HEAD COLUMNS

|   | HC1-2 | HC2-3 | HC3-4 | HC4-5 |
|---|---|---|---|---|
| R | 2.21 | 0.39 | 1.76 | 0.61 |
| G | 1.39 | 1.33 | 3.08 | 2.72 |
| B | 1.55 | 1.01 | 2.03 | 2.07 |

FIG.16B

DIFFERENCE BETWEEN AVERAGE HUE ANGLE AND HUE ANGLE OF EACH HEAD COLUMN

|   | HC1 | HC2 | HC3 | HC4 | HC5 |
|---|---|---|---|---|---|
| R | -0.12 | 0.10 | 0.06 | 0.25 | 0.31 |
| G | 1.29 | 0.80 | 0.41 | -1.08 | 0.44 |
| B | -0.29 | -0.70 | 0.10 | 1.11 | -0.52 |

FIG.16C

ADJUSTMENT DIRECTION OF ADJUSTMENT TARGET HEAD COLUMN

|   | HC1 | HC2 | HC3 | HC4 | HC5 |
|---|---|---|---|---|---|
| R |  |  |  |  |  |
| G |  |  |  | + |  |
| B |  |  |  |  |  |

COLOR ADJUSTMENT DETERMINATION METHOD AND INFORMATION PROCESSING APPARATUS

CROSS-REFERENCE TO RELATED APPLICATIONS

The present application is a continuation application and claims priority under 35 U.S.C. 120 to U.S. patent application Ser. No. 15/665,525 filed on Aug. 1, 2017, which claims priority under 35 U.S.C. § 119 to Japanese Patent Application No. 2016-155078 filed on Aug. 5, 2016 and Japanese Patent Application No. 2017-139326 filed on Jul. 18, 2017. The entire contents of the foregoing applications are incorporated herein by reference.

BACKGROUND OF THE INVENTION

1. Field of the Invention

The present invention relates to a color adjustment determination method and an information processing apparatus.

2. Description of the Related Art

Inkjet printing apparatuses are image forming apparatuses that record an image by ejecting fine ink droplets from an ink head onto a recording medium. In recent years, inkjet printing is being implemented not only in home and office equipment but also in commercial printing machines.

Techniques are used in inkjet printers to reduce color difference in a printed image (color unevenness adjustment). For example, Japanese Unexamined Patent Publication No. 2011-199409 describes a method for correcting color density in a printing machine by obtaining a correction value based on an average brightness or an average density of multiple gradation patterns.

However, Japanese Unexamined Patent Publication No. 2011-199409 does not describe a technique for implementing color adjustment with respect to an image printed by multiple heads of an inkjet printing apparatus that has multiple heads arranged in the main scanning direction.

SUMMARY OF THE INVENTION

An aspect of the present invention is directed to providing a color adjustment determination method that can quantitatively and accurately determine whether a color difference of an image printed by a plurality of heads should be adjusted.

According to one embodiment of the present invention, a color adjustment determination method is provided that includes forming a color adjustment image on a recording medium by moving a plurality of heads including a plurality of nozzles relative to the recording medium in a relative moving direction and ejecting liquid from the plurality of heads that are arranged in an orthogonal direction orthogonal to the relative moving direction, acquiring colorimetric values of a plurality of portions of the color adjustment image formed by the plurality of heads that are arranged at different positions in the orthogonal direction, calculating a color difference between at least two portions of the plurality of portions of the color adjustment image based on the colorimetric values of the plurality of portions, and determining whether at least one of the plurality of heads that have ejected the liquid requires adjustment based on the calculated color difference.

BRIEF DESCRIPTION OF THE DRAWINGS

FIG. 10 is a table indicating colorimetric values obtained for multiple sections of a head that is displayed on the information processing apparatus when a primary color is subject to color adjustment;

FIGS. 11A-11C are tables indicating values calculated for setting an adjustment value for a primary color that are displayed on the information processing apparatus;

FIG. 15 is a table indicating colorimetric values obtained for multiple sections of a head that is displayed by the information processing apparatus when a secondary color is subject to color adjustment;

FIGS. 16A-16C are tables indicating values calculated for setting an adjustment value for a secondary color that are displayed on the information processing apparatus.

DESCRIPTION OF THE EMBODIMENTS

Figure 1:
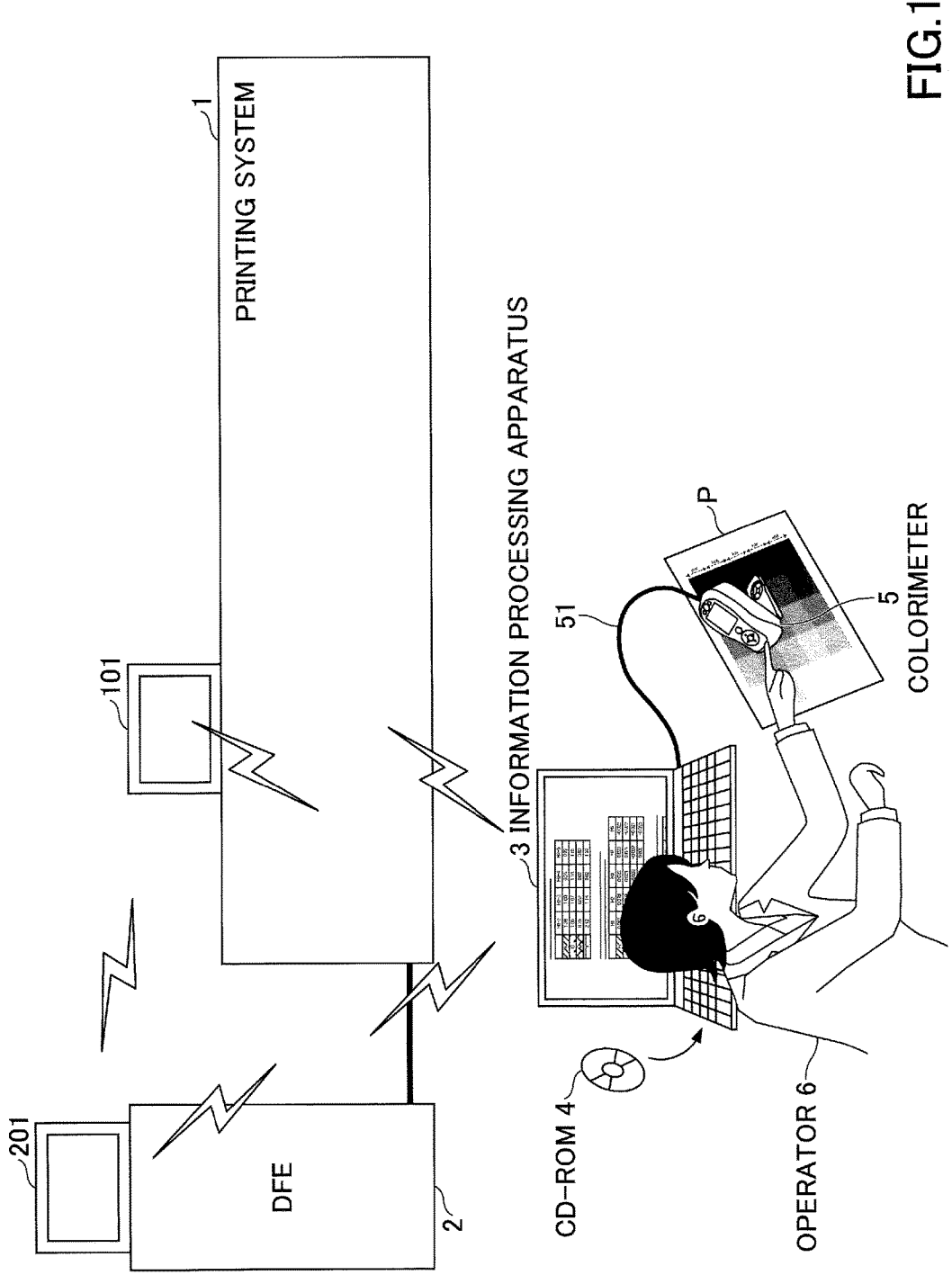
FIG. 1 is an overall view of color measurement and color adjustment of a color adjustment image formed on a recording medium by a printing system.

In the following, embodiments of the present invention are described with reference to the accompanying drawings. Note that elements and features depicted in the drawings that are substantially identical are given the same reference numerals and overlapping descriptions thereof may be omitted.

Overall System

FIG. 1 is a diagram illustrating a system capable of implementing a color adjustment determination method according to an embodiment of the present invention.

In FIG. 1, a printing system 1 that receives a signal from a DFE (Digital Front End) 2 forms a color adjustment image (evaluation image, inspection image) on a recording medium P. The color adjustment image is formed on the recording medium P by ejecting ink droplets (droplets) of a predetermined color are from a plurality of heads (see FIG. 3) of printing mechanisms (image forming units) 120 and 160 (see FIG. 2), and the recording medium P on which the color adjustment image has been formed is output. The ink is an example of a liquid, which may be aqueous or oil-based, for example. Further, the liquid may be a photo-curable liquid that is cured by UV light, for example. Further, the liquid may contain a dye or a pigment, for example.

An operator (operator, customer engineer, etc.) 6 measures (evaluates) the colors in the color adjustment image formed on the recording medium P using a colorimeter 5 and acquires color information.

The colorimeter 5 obtains the spectral reflectance of each wavelength of each color of a color adjustment image portion on the recording medium P and obtains L*a*b* colorimetric values and KCMY density information (solid density). Note that the colorimetric values may be directly obtained without obtaining the spectral reflectance, for example. Further, the calorimetric values to be obtained do not necessarily have to be L*a*b* values but may be a colorimetric value based on a uniform color space or a value convertible into a colorimetric value based on a uniform color space. For example, the calorimetric values to be obtained may be L*u*v* values or CIEXYZ values based on the CIELUV color space. For the sake of convenience, the colorimetric values will mainly be described as L*a*b* values based on the CIELAB color space, and L*u*v* values based on the CIELUV color space will be additionally described.

Note that the KCMY density information may also be directly obtained without obtaining the spectral reflectance. Further, in some examples, the L*a*b* values or L*u*v* values of each color may be used as the density information. Also, the density information is not limited to information on the four colors, K (black), C (cyan), M (magenta), and Y (yellow), as long as the density is associated with the ink color. For example, if a printing apparatus is equipped with violet and/or orange ink, the solid density of violet and/or orange may also be measured.

The color information measured by the colorimeter 5 may be transmitted to an information processing apparatus 3, for example. Alternatively, the operator may 6 manually input the color information measured by the colorimeter 5 to the information processing apparatus 3.

Based on the color information that has been transmitted from the colorimeter 5 or manually input by the operator 6, the information processing apparatus 3 calculates adjustment values for manually adjusting color unevenness of heads H1Y to H7Y or head columns HC1 to HC7 (see FIG. 3), for example, and displays the calculated adjustment values. The information processing apparatus 3 is a terminal that has computational capabilities and can be viewed by the operator 6. For example, the information processing apparatus 3 may be a personal computer, a tablet, a smartphone, or some other type of dedicated wireless terminal.

Note that a color adjustment determination program for executing the color adjustment determination method according to an embodiment of the present invention is installed in the information processing apparatus 3 in advance. For example, the color adjustment determination program may be read from a CD-ROM 4 and installed in the information processing apparatus 3, or may be delivered via an electric communication line such as the Internet.

The information processing apparatus 3 may transfer the calculated adjustment values to an input unit 201 of the DFE 2 or an input unit 101 of the printing system 1. Alternatively, the operator 6 may manually input the adjustment values displayed on the information processing apparatus 3 to the input unit 201 or the input unit 101, for example.

Printing System

Figure 2:
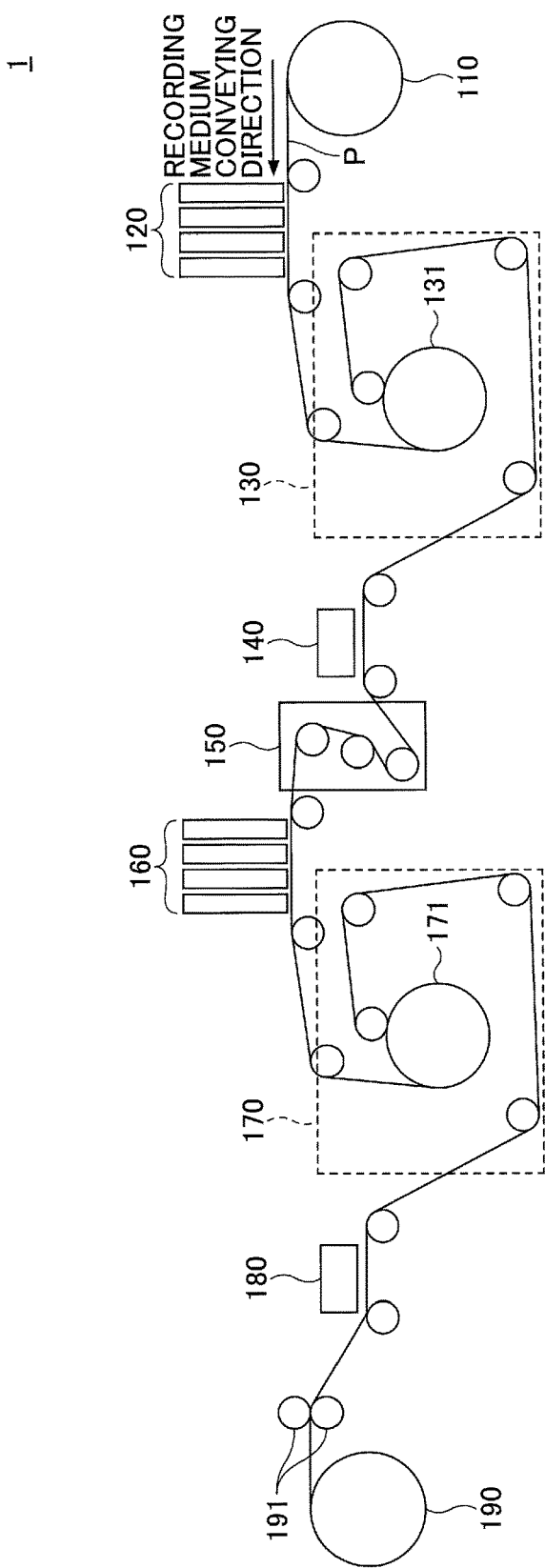
FIG. 2 is an overall schematic view of a printing system.

FIG. 2 is an overall schematic view of the printing system 1. FIG. 2 illustrates an inkjet continuous paper machine as an example of the printing system 1 according to one embodiment of the present invention.

In FIG. 2, the printing system 1 includes a sheet feeding mechanism 110, a front-side printing mechanism 120, a post-drying mechanism 130, an image inspection mechanism 140, a reversing mechanism 150, a backside printing mechanism 160, a post-drying mechanism 170, an image inspection mechanism 180, and a winding device 190.

A recording medium P, such as paper or a recording sheet, is unwound by the paper feeding mechanism 110 acting as an unwinder to reach the printing mechanism 120 that performs printing on a front side (first side) of the recording medium P.

Note that a mechanism for applying a processing liquid (pretreatment liquid) for controlling the permeability of ink on the recording surface of the recording medium P may be provided upstream of the printing mechanism 120, for example.

The recording medium P that has passed through the printing mechanism 120 passes through the drying mechanism 130, which is a drying device for drying the front side of the recording medium P, and then passes through the image inspection mechanism 140.

In the present embodiment, the drying mechanism 130 includes a heat drum 131 that comes into contact with the backside of the paper to heat the recording medium P. Although the heating temperature of the heat drum 131 may vary depending on the print speed and ink drying properties, for example, the heating temperature may be set to about 50° C. to 100° C., for example. Note that the drying mechanism 130 is not limited to the above example using the heat drum 131 and may instead be a mechanism using warm air, infrared rays, pressurized, ultraviolet rays, high frequencies, or any combination of the above, for example. Also, in a case where the ink is a curable ink, a curing mechanism may be provided in place of the drying mechanism, for example.

The image inspection mechanism (automatic inspection mechanism) 140 is provided downstream of the drying mechanism 130 and performs automatic inspection for color unevenness adjustment. The image inspection mechanism 140 includes a scanner or some other mechanism for reading color information of an image and a control mechanism for computing the color information read by the scanner. The scanner of the image inspection mechanism 140 reads the color information of the color adjustment image for automatic adjustment of color unevenness. The color information read from the color adjustment image may be subjected to arithmetic processing by the control mechanism of the image inspection mechanism 140, the control unit 101 of the printing system 1, or the DFE 2 corresponding to a computer connected to the printing system 1. Note that the image inspection mechanism 140 may be used inline, but may also be used offline.

After passing through the image inspection mechanism 140, the recording medium P passes through the reversing mechanism 150 that reverses the recording medium P from the front side to the backside, passes through the printing mechanism 160 that prints the backside (second side) of the recording medium P, passes through the drying mechanism 170 that dries the backside, and passes through the image inspection mechanism 180.

Note that the image inspection mechanism 180 may have functions substantially identical to those of the image inspection mechanism 140, and the image inspection mechanism 180 may perform color unevenness adjustment on the backside of the recording medium P in a manner similar to the above-described color unevenness adjustment performed by the image inspection mechanism 140.

Finally, the recording medium P is wound up by the winding device (rewinder) 190, which is an example of a post-processing device for processing the printed recording medium P after printing. Note that in some examples, the post-processing operations after printing may include an unloading process including a cutting operation for cutting the recording medium P using a cutter instead of the above-described rewinding process.

Head Configuration

Figure 3:
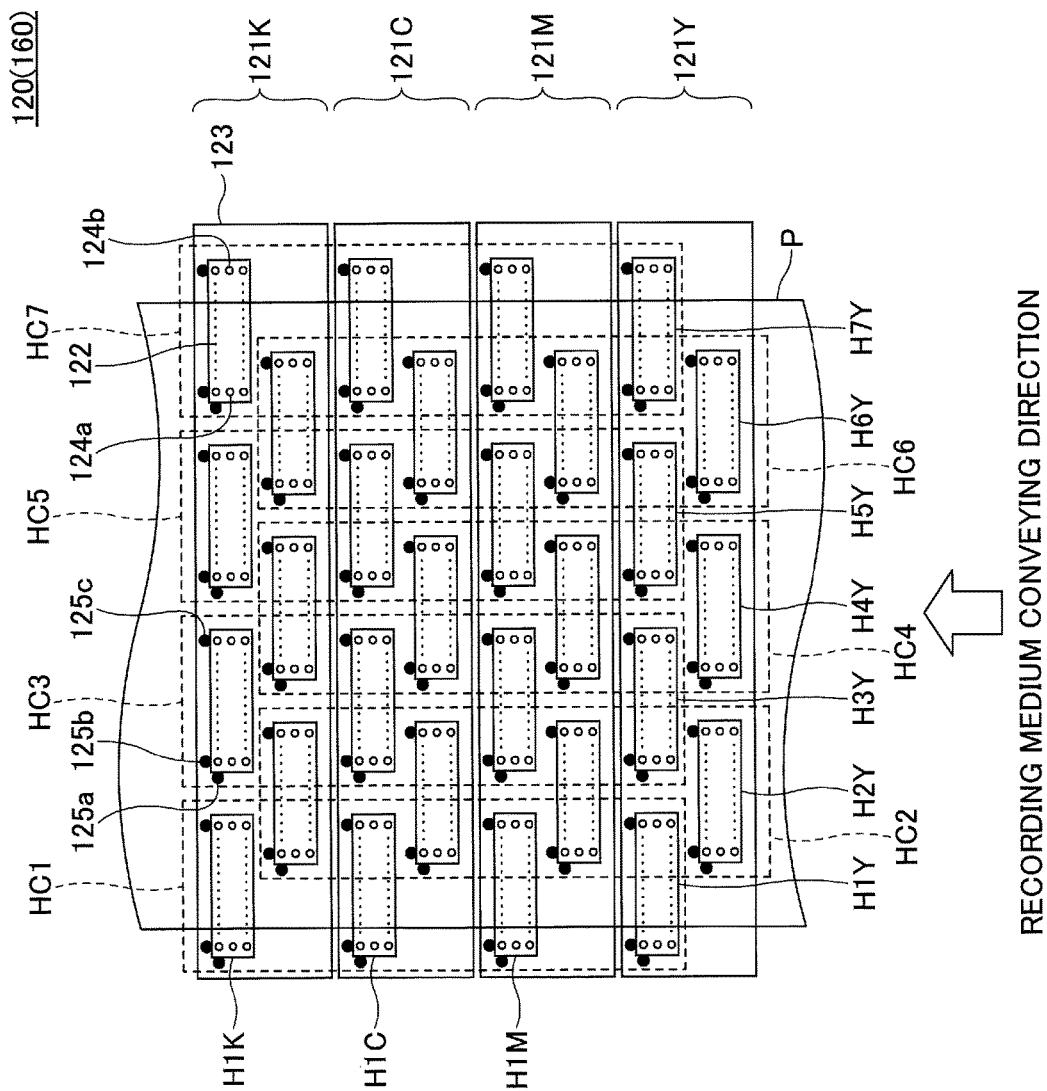
FIG. 3 is a schematic view of recording heads arranged into a line head configuration according to an embodiment of the present invention.

FIG. 3 is a bottom view of recording heads arranged into a line head configuration according to an embodiment of the present invention. Specifically, FIG. 3 is a bottom plan view of a plurality of recording heads included in the printing mechanism 120 (or 160) of FIG. 2 that are staggeringly arranged.

The recording medium P is conveyed to the printing mechanism 120 (or 160) by a plurality of rollers in a sheet conveying direction as indicated by the arrow in FIG. 2. Note that the printing mechanisms 120 and 160 have substantially the same configuration, and as such, the printing mechanism 120 will be described below as an example. In FIG. 3, the printing mechanism 120 includes a head unit 121 constituting a single-pass inkjet line head.

For example, the printing mechanism 120 may include head units 121 for ejecting ink droplets of basic colors including black (K), cyan (C), magenta (M), and yellow (Y) to form an image on the recording medium P. Further, in some embodiments, heads for ejecting ink droplets of specific colors (special colors), such as orange and/or violet and heads for ejecting droplets of overcoating that gives glossiness and/or other processing liquid may be provided as additional head units 121.

Note that the head unit 121 needs to have a width greater than or equal to the width of the image recordable range of the record medium P, and as such, the head unit 121 is formed by joining together a plurality of ink jet recording heads each having multiple nozzle holes (nozzles) 122 for discharging ink droplets arranged into rows. In FIG. 3, a yellow head unit 121Y has a plurality of heads (recording heads) H1Y to H7Y arranged therein. Similarly, a magenta head unit 121M, a cyan head unit 121C, and a black head unit 121K each have a plurality of heads arranged therein.

The head unit 121 can be evacuated (moved aside) from a conveying path along which the recording medium is conveyed, and while evacuated, a maintenance operation may be performed on the head unit 121 to clean the nozzle surface and eject thickened ink from the nozzles.

In FIG. 3, each head unit 121 has a total of seven inkjet recording heads staggeringly arranged on a flat base frame 123 into two rows extending in a direction orthogonal to the conveying direction of the recording medium P, and side end portions of each inkjet recording head are fixed to the base frame 123 by screws 124*a* and 124*b*.

Also, the position of each inkjet recording head in a main scanning direction (a direction orthogonal to the recording medium conveying direction) and a sub scanning direction (recording medium conveying direction) is determined by three positioning faces 125*a,* 125*b,* and 125*c* (represented by black dots in FIG. 3).

In the present embodiment, as illustrated in FIG. 3, inkjet recording head units 121K, 121C, 121M, and 121Y for four different colors, for example, K, C, M, Y are arranged along the conveying direction of the recording medium P and is fixed to a main frame (not shown) by screws.

These heads and nozzles have variations in discharge characteristics and other properties, and as such, color differences occur between the colors reproduced by different heads and different nozzles within the head as a result of printing. Therefore, color unevenness adjustment for adjusting color unevenness is necessary.

Also, a plurality of heads aligned in the conveying direction (e.g., heads H1Y, H1M, H1C, and H1K) can form a secondary color or a tertiary color on the recording medium by ejecting different inks. For the sake of convenience, these heads aligned in the conveyance direction will be referred to as head column HC1, head column HC2, head column HC3, head column HC4, head column HC5, head column HC6, and head column HC7.

Information Processing Apparatus

Figure 4:
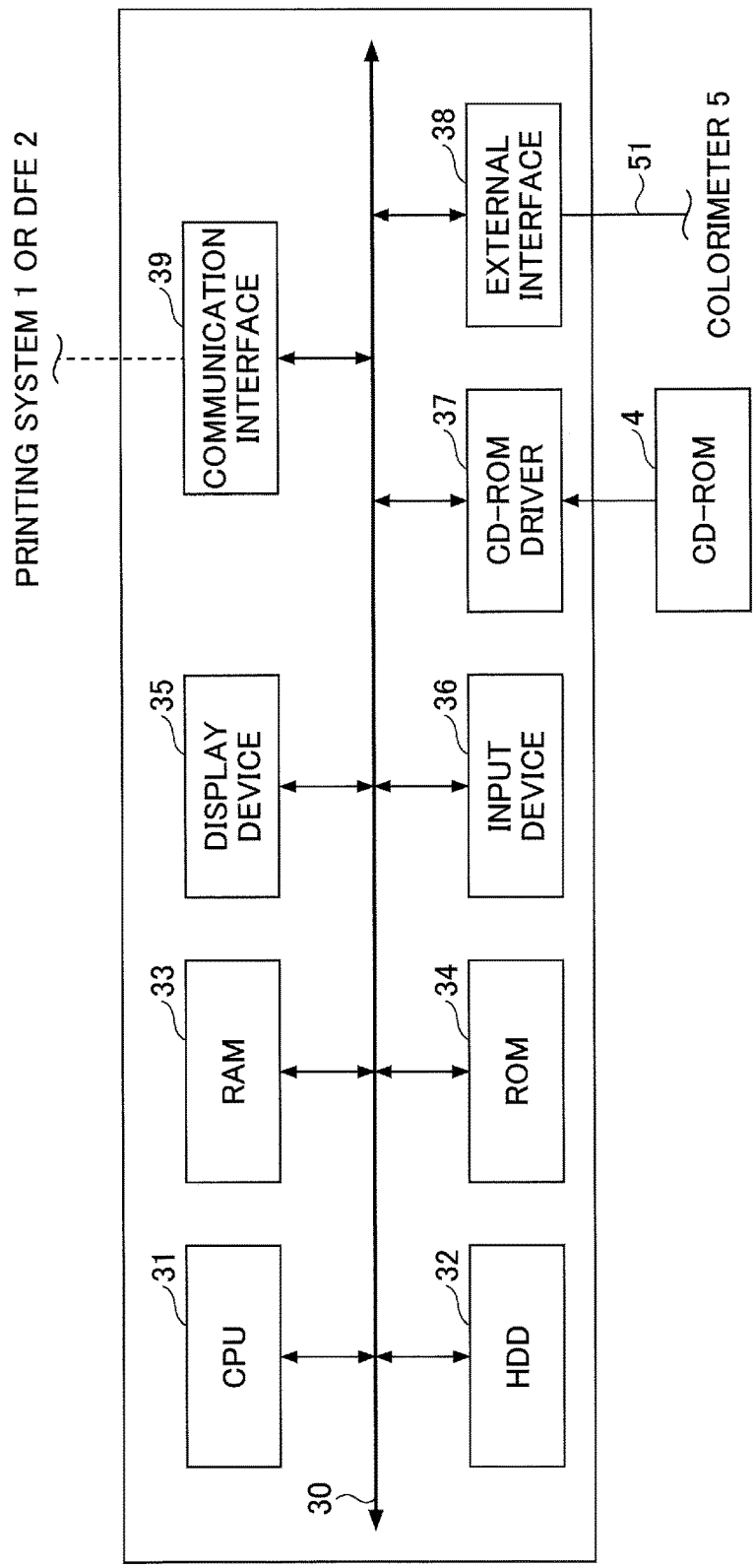
FIG. 4 is a block diagram illustrating an example hardware configuration of an information processing apparatus.

FIG. 4 is a block diagram illustrating an example hardware configuration of the information processing apparatus 3. In FIG. 4, the information processing apparatus 3 includes a CPU (Central Processing Unit) 31, an HDD (Hard Disk Drive) 32, a RAM (Random Access Memory) 33, a ROM (Read Only Memory) 34, a display device 35, an input device 36, a CD-ROM driver 37, an external interface 38, and a communication interface 39 that are connected to each other via a bus 30.

The CD-ROM driver 37, which is an example of a drive device, is an interface with a CD-ROM 4, which is an example of a removable recording medium. In this way, the information processing apparatus 3 can read information from and/or write information in the storage medium, such as the CD-ROM 4, via the CD-ROM driver 37. The color adjustment determination program according to an embodiment of the present invention may be stored in a storage medium, such as the CD-ROM 4 or a USB storage device, and read by the information processing apparatus 3 via the CD-ROM driver 37 or a USB driver, for example. Alternatively, the color adjustment determination program may be installed in the HDD 32 of the information processing apparatus 3, for example.

The HDD 32 is a nonvolatile storage device that stores various programs and data. The stored programs and data may include an information processing system (e.g., OS (Operating System) corresponding to basic software, such as Windows (registered trademark) or UNIX (registered trademark)) and applications that are run on the information processing system to provide various functions (e.g., document creation/table creation/editing functions).

For example, the color adjustment determination program according to an embodiment of the present invention also uses some of the applications for implementing functions, such as a table creation function and a calculation function.

Also, the HDD 32 manages the stored programs and data using a predetermined file system and/or DB (database).

The input device 36 may include a keyboard and a mouse, for example, and is used to input operation signals to the information processing apparatus 3.

The external interface 38 is an interface for establishing connection with an external device by wired connection, and may be a USB driver, for example. In the present embodiment, the external interface 38 can be connected to the colorimeter 5 via a wiring (e.g., USB cable) 51. In this case, color information acquired by the colorimeter 5 is transferred to the information processing apparatus 3 via the wiring 51. Note that if the storage medium storing the color adjustment determination program is a USB memory, the color adjustment determination program may be executed via the external interface 38 that corresponds to a USB driver, for example.

The display device 35 includes a display, for example, and is configured to display information, such as a processing result (e.g., "print result") of the information processing device 3, a GUI (Graphical User Interface) (e.g., setting screen relating to color conversion), color information such as colorimetric values, values being calculated (KCMY density, hue angle, etc.), and adjustment values as illustrated in FIGS. 10, 11, 15, and 16.

The communication interface 39 is an interface that can be connected to the printing system 1 or the DFE 2 by wireless connection. The information processing apparatus 3 transfers a calculation result (e.g., adjustment target head, adjustment value) calculated based on acquired color information to the printing system 1 or the DFE 2 via the communication interface 39.

The ROM 34 is a nonvolatile semiconductor memory capable of retaining internal data even when the power is turned off. The ROM 34 may stores a basic input/output system (BIOS) that is executed when the information processing apparatus 3 is activated and data, such as system settings and network related settings of the information processing apparatus 3, for example.

The RAM 33 is a volatile semiconductor memory (storage device) that temporarily stores programs and data read from the various storage devices described above.

The CPU 31 executes a program loaded in the RAM 33 to perform overall control of the information processing apparatus 3 and implement various functions of the information processing apparatus 3.

With the above-described hardware configuration, the information processing apparatus 3 can have the CPU 31 execute a program relating to a print driver or an application that has been read from the HDD 32 and loaded in the RAM 33, for example, to perform processes, such as calculating color adjustment values and transmitting the calculated color adjustment values.

Figure 5:
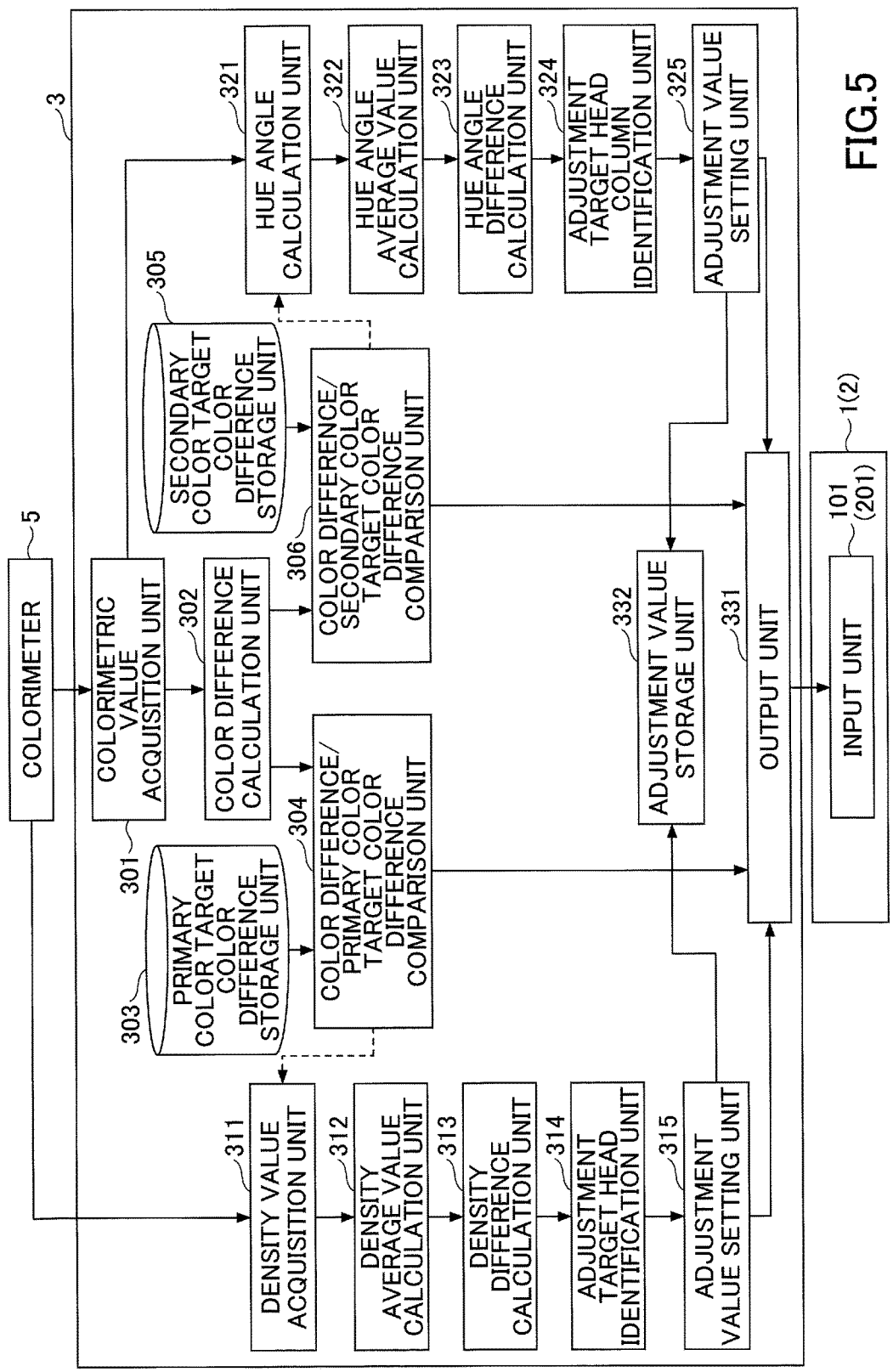
FIG. 5 is a block diagram illustrating an example functional configuration of the information processing apparatus.

FIG. 5 is a block diagram illustrating an example functional configuration of the information processing apparatus 3 that can be implemented by the hardware configuration as illustrated in FIG. 4.

In FIG. 5, the information processing apparatus 3 includes a colorimetric value acquisition unit 301, a color difference calculation unit 302, a primary color target color difference storage unit 303, a color difference/primary color target color difference comparison unit 304, a secondary color target color difference storage unit 305, and a color difference/secondary color target color difference comparison unit 306. The color difference/primary color target color difference comparison unit 304 and the color difference/secondary color target color difference comparison unit 306 function as an adjustment necessity determination unit for determining whether color adjustment is necessary based on a comparison result.

Further, the information processing apparatus 3 includes a density value acquisition unit 311, a density average value calculation unit 312, a density difference calculation unit 313, an adjustment target head identification unit 314, and an adjustment value setting unit 315.

Further, the information processing apparatus 3 includes a hue angle calculation unit 321, a hue angle average value calculation unit 322, a hue angle difference calculation unit 323, an adjustment target head column identification unit 324, and an adjustment value setting unit 325.

The information processing apparatus 3 also includes an output unit 331 for outputting data. Note that outputting data includes displaying data and may also include transmitting data, for example. When executing the color adjustment determination method according to an embodiment of the present invention, the output unit 331 may be implemented by the display device 35 and the communication interface 39 of FIG. 2, for example.

The information processing apparatus 3 may also include an adjustment value storage unit 332 for storing the adjustment value, for example.

Note that the colorimetric value acquisition unit 301 and the density value acquisition unit 311 implement a color information acquisition unit for obtaining color information from the colorimeter 5.

In FIG. 5, the functional units 311 to 315 relating to densities (solid densities) of K, C, M and Y are used for primary color adjustment, and the functional units 321 to 325 relating to the hue angle may be used for adjustment of a secondary color, a tertiary color, or a primary color.

Note that a primary color is a single color generated on the recording medium by one type of ink, such as Y (yellow), M (magenta), C (cyan), and K (black). On the other hand, a secondary color is a color generated on the recording medium by ejecting two or more types of ink from two or more different heads, such as R (red), G (green), and B (blue). Note that in a case where the printing system 1 is provided with inks in R (red), G (green), B (blue) are provided, the colors R (red), G (green), and B (blue) may also correspond to primary colors. That is, the concept of a secondary color is not limited to a specific color, but refers to a color generated on a recording medium using two types of ink.

In the following, the functional units will be described in further detail with reference to FIGS. 6-11.

Process Flow

Figure 6:
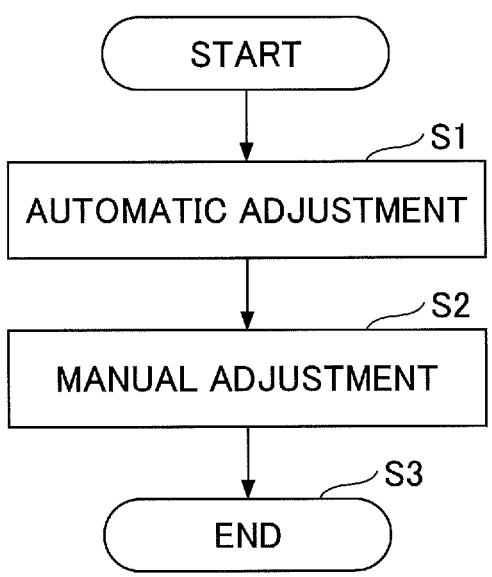
FIG. 6 is a flowchart illustrating an overall process flow to which a color adjustment determination method according to an embodiment of the present invention is applied.

FIG. 6 is a flowchart illustrating a schematic flow a color adjustment process to which the color adjustment determination method according to an embodiment of the present invention is applied. In the color adjustment process of FIG. 6, automatic adjustment is first performed in step S1, and manual adjustment is performed in step S2, after which the color adjustment process is ended (step S3).

Note that color differences between different nozzles tend to be relatively small, and as such, adjustment by automatic adjustment is adequate in many cases. However, sensitivity of the scanner with respect to gradation may not be adequate with respect to color differences between different heads, which tend to be larger than the color differences between nozzles, such that even if automatic adjustment of step S1 is repeated, the color differences between the different heads may not be adequately detected to accurately predict adjustment values and adjustment may thus be more difficult. Note that in the following, a color difference between images formed by a plurality of heads may be referred to as head-to-head color difference.

Thus, in step S2, in order to adjust the color unevenness between different heads that remain after the automatic adjustment of step S1 is performed, the color difference between the different heads is adjusted by manual adjustment. Note that manual adjustment increases the burden of the operator, and as such, manual adjustment of the color difference between different heads is preferably performed after automatic adjustment of color differences between nozzles of a head is performed.

As described above, automatic adjustment is performed mainly for color adjustment of color differences within the same head, and manual adjustment is performed for color adjustment of color differences between different heads.

Note that typically, the operator makes a visual determination of whether manual adjustment for adjusting color differences between heads should be performed. Thus, adjustment accuracy depends on the skill of the operator, and achieving a target head-to-head color difference may be difficult in some cases. Also, achieving the target head-to-head color difference may take a substantially long time in some cases.

In this respect, in the color adjustment determination method according to an embodiment of the present invention, the information processing apparatus 3 executes a process of determining whether to perform color adjustment with respect to a head in the manual adjustment process of step S2.

Color Adjustment Image

The following description relates to a color adjustment image that is used in a color information acquisition step (color measurement step, color density measurement step) performed in the automatic adjustment process of step S1 and the manual adjustment process of step S2 of FIG. 6 as described in detail below with reference to FIGS. 8, 9, 13, and 14.

Figure 7A:
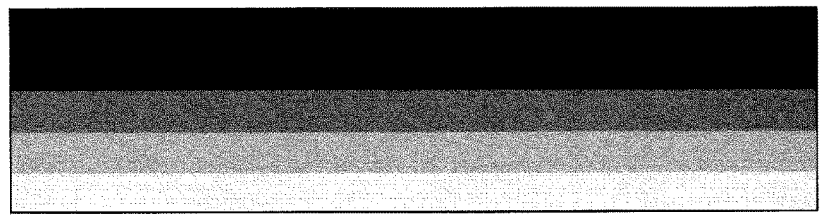
FIGS. 7A-7C are diagrams illustrating original image data with multiple color gradation levels, a color adjustment image for acquiring color information, and a color checking image.
Figure 7B:
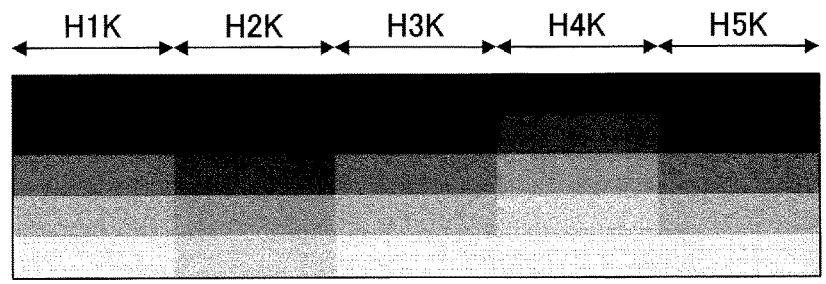
Figure 7C:
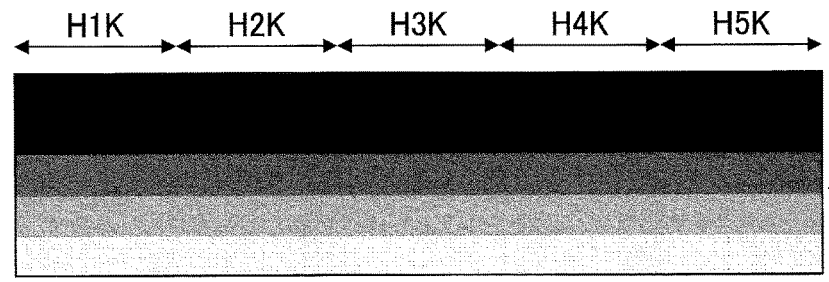

FIGS. 7A-7C are diagrams illustrating examples of original image data with multiple color gradation levels, a color adjustment image for acquiring color information, and a color checking image. FIG. 7A represents gradation data for color adjustment corresponding to original image data to be printed by the printing system 1, FIG. 7B represents a color adjustment gradation image (color adjustment gradation chart) printed on a recording medium based on the gradation data, and FIG. 7C represents a color checking gradation image printed on the recording medium after color adjustment (color checking gradation chart). Note that a color adjustment gradation image is an example of a color adjustment image. Further, a color checking gradation image is an example of a color checking image.

Note that in FIG. 3, an example where seven heads (e.g., heads H1Y to H7Y) are arranged in each of the head units 121K, 121O, 121M, and 121Y is illustrated. However, in the example described below, it is assumed that five heads H1 to H5 are arranged in each of the head units 121K, 121C, 121M, and 121Y. Note that the five heads arranged in the black head unit 121K are referred to as heads H1K to H5K, the five heads arranged in the cyan head unit 121O are referred to as heads H1C to H5C, the five heads arranged in the magenta head unit 121M are referred to as heads H1K to H5K, and the five heads arranged in the yellow head unit 121Y are referred to as heads H1Y to H5Y.

FIGS. 7A-7C illustrate an example color gradation of the color black (K). The gradation data of FIG. 7A has the color black (K) set at five different density levels (steps), i.e., 20%, 40%, 60%, 80%, and 100% from the bottom to the top.

Note that a KCMY density of a primary color, corresponding to a single color formed by a single type of ink, may also be referred to as "CMYK density", "tone", "solid density", "film thickness", "ink thickness", and "constituent concentration value". More specifically, the KCMY density expresses a shade of color according to the density of dots within a range to be filled by halftone dots: Note, however, that the density of a color to be displayed may vary depending on the color discharged by the heads, and the density is not limited to the KCMY density of the four colors K, C, M, and Y.

Based on the gradation data having five different levels, for example, black recording heads H1K to H5K output a color adjustment gradation image (color adjustment gradation chart). As illustrated in the color adjustment image of FIG. 7B, variations may occur in the color (density) of the image output by the black recording heads H1K to H5K.

In this case, color adjustment by manual adjustment as indicated in step S2 of FIG. 6 is performed to reduce the color differences between the heads. Specifically, for example, settings in the printing system 1 may be changed such that a portion of the color adjustment gradation chart of FIG. 7B that has a relatively low density (e.g., portion output by the recording head H4K) is shifted (adjusted) to a higher gradation level, and a portion of the color adjustment gradation chart that has a relatively high density (e.g., portion output by the recording head H2K) is shifted (adjusted) to a lower gradation level.

As a result of the above setting change, the color checking gradation chart of FIG. 7C that is output after performing color adjustment may have a color gradation similar to that of the original image data of FIG. 7A.

Note that although FIGS. 7A-7C illustrate an example where the black recording heads H1K to H5K output a color adjustment gradation chart based on gradation data, a similar layout may be used to output color adjustment gradation charts of other primary colors to be examined that are formed by a single type of ink, such as C (cyan), M (magenta) and Y (yellow), for example.

In the case of examining secondary colors obtained by mixing two types of ink, gradation data similar to that illustrated in FIG. 7A may be used to output color adjustment gradation charts of secondary colors, such as R (red), G (green), and B (blue), for example. The RGB color adjustment gradation charts are preferably patterns in the colors R, G, and B, respectively having primary colors contained at the same ratio, for example.

Note that although FIGS. 7A-7C illustrate an example where five different gradation levels are represented, in other examples, a color adjustment gradation chart output based on gradation data having gradation levels incremented at 10% intervals from 0% to 100% may be used. By outputting such a color adjustment gradation chart with ten different color gradation levels (10%, 20%, . . . , 100%,) and examining the colors (density) corresponding to the ten different gradation levels, color unevenness may be adjusted with higher accuracy, for example.

Also, in other examples, the number of gradation levels to be output in the color adjustment gradation chart may be reduced. For example, in many cases, a color change with respect to gradation (e.g., gradation-density characteristics) tends to be linear within a certain gradation range, and as such, several representative gradation levels may be selected and the rest of the gradation levels may be adjusted to reflect the same adjustment values as those for the representative gradation levels. As one specific example, the gradation may be divided into three groups of 10% to 50%, 60% to 80%, and 90% to 100%, and adjustment values obtained at 50%, 80%, and 100% may be used as adjustment values for the respective groups. In this way, the number of color measurement instances may be reduced.

Alternatively, color information may be acquired by outputting a gradation chart having an arbitrary number of gradation levels as a print image. For example, an arbitrary gradation to be adjusted may be matched with control adjustment points provided by the DFE 2, for example, and the gradation may be adjusted to have an optimum number of gradation levels for the hardware.

Further, the gradation level setting for an image to be printed may be based on gradation regions where gradation-color characteristics are linear.

In the present embodiment, the colorimeter 5 acquires color information using the color adjustment gradation chart (see FIG. 7B) printed on the recording medium P based on the gradation data having regions set up in the above-described manner (see FIG. 7A). At this time, for example, in the case of acquiring color information of a black (K) color adjustment gradation chart, colorimetric values of each portion formed by each of the black recording heads H1K, H2K, H3K, H4K, and H5K are acquired. Note that each of the horizontal rows of the color adjustment image of FIG. 7B correspond to a region formed by the black recording heads H1K, H2K, H3K, H4K, and H5K that has the same gradation level in the original image data of FIG. 7A.

Note that color information acquired by the colorimeter 5 to be used for calculating an adjustment value includes at least colorimetric values (L*a*b* values) in the case where the color being examined is a primary color. Further, in order to improve adjustment accuracy, other various color information, such as density and XYZ color system values may also be included.

On the other hand, in the case where the color being examined is a secondary color, colorimetric values (L*a*b* values) may suffice as the color information for acquiring adjustment values, and the hue angle may be obtained from the colorimetric values and used for calculation of the adjustment value. The colorimetric values may also be L*u*v* values or CIEXYZ values. Also, the hue angle does not have to be determined based on the colorimetric values but may be obtained directly as hue angle "hab" (CIELAB hue angle) or "huv" (CIELUV hue angle), for example.

The information processing apparatus 3 uses the color information of the color adjustment image output onto the recording medium P as described above to calculate an adjustment value to be used upon performing color adjustment by manual adjustment.

Note that in the example of FIGS. 7A-7C, color information of the color adjustment image is acquired with respect to each portion formed by each of the recording heads and an adjustment value is obtained with respect to each of the recording heads. However, color adjustment is not limited to being implemented with respect to each recording head. In some examples, a plurality of points within a portion formed by the same head may be measured in order to reduce influences of measurement variations depending on the print position.

In some examples, color adjustment may be implemented with respect to each nozzle, and in other examples, nozzles may be divided into blocks (sections) and color adjustment may be implemented with respect to each block of nozzles. For example, gradation-color characteristics may vary between edge portions and a middle portion of a head, and as such, a head may be divided into three sections, including left, middle, and right sections, as described below with reference to FIG. 10. In such case, color measurement may be performed with respect to each section, and an average value of the three sections may be used as color information of one head to be used for color adjustment, for example.

Manual Adjustment of Primary Color

Figure 8:
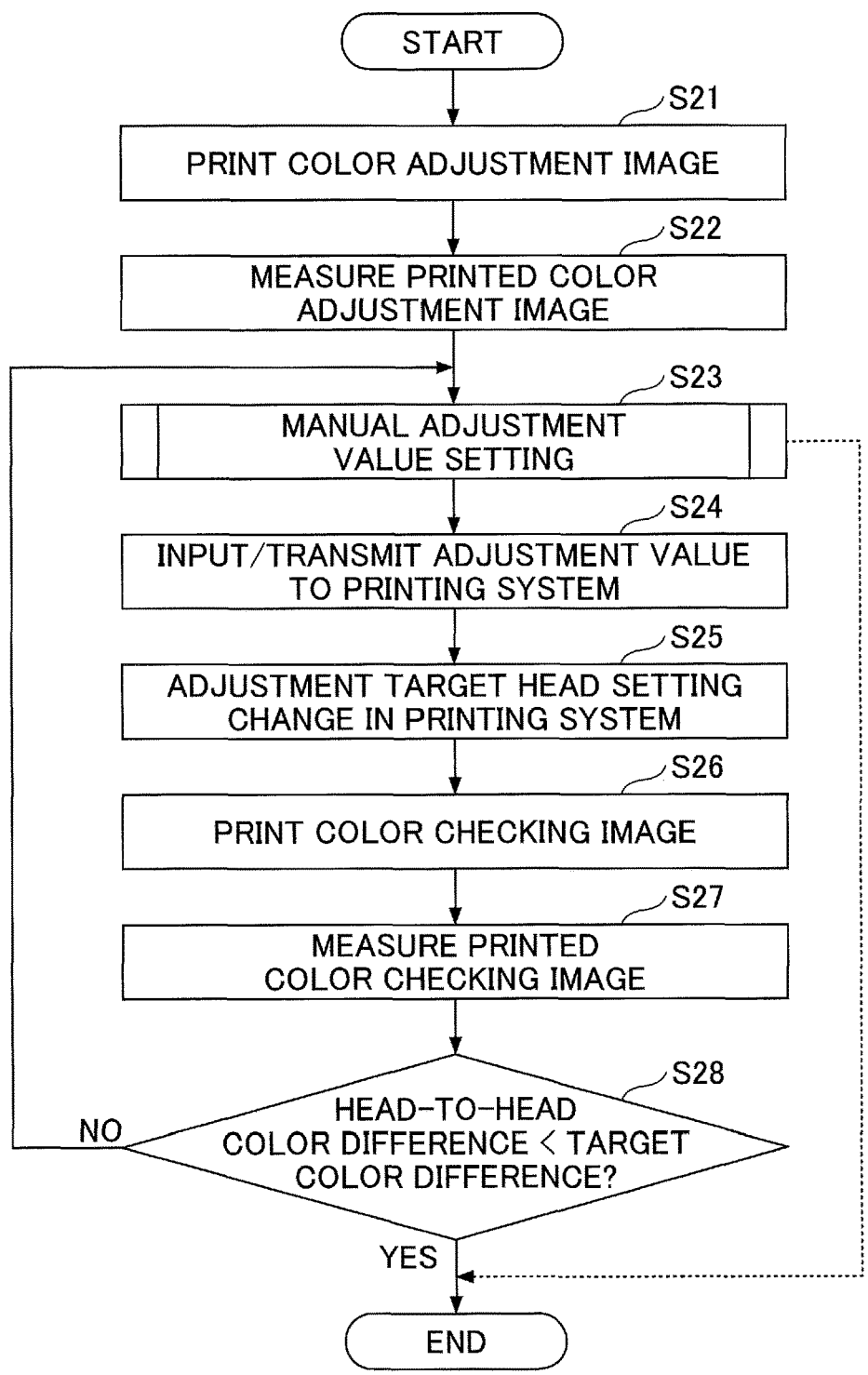
FIG. 8 is a flowchart illustrating manual adjustment of a primary color.

FIG. 8 is a flowchart illustrating a schematic process flow of manual adjustment of a primary color according to a first embodiment (control example) of the present invention.

When an instruction to start adjustment is issued by the operator 6 in step S21, the printing system 1 prints a color adjustment image (color adjustment gradation chart) based on gradation data (e.g., gradation data of FIG. 7A) in order to acquire color information for heads and nozzles with respect to each gradation and with respect to each head (formation step).

In step S22, the colorimeter 5 measures the colors of the color adjustment image (color adjustment gradation chart) printed in step S21 (e.g., color adjustment image of FIG. 7B) to acquire color information.

In step S23, the information processing apparatus 3 acquires the color information and sets an adjustment value for a head that needs adjustment based on the acquired color information. Note that the adjustment value setting method will be described in detail below with reference to FIG. 9.

In step S24, the information processing apparatus 3 may transmit the adjustment value set up in step S23 to the printing system 1 (or the DFE 2), for example. Alternatively, the operator 6 may manually input the adjustment value that is displayed on the information processing apparatus 3 to the input unit 101 of the printing system 1 (or the input unit 201 of the DFE 2), for example.

In step S25, the printing system 1 (or DFE 2) implements a setting change so that the adjustment value for the head corresponding to the adjustment target is reflected in the nozzles (nozzle group) of the adjustment target head. As an example of the setting change, a head driving voltage (shape of a driving waveform applied to a driving member, such as a piezoelectric element, for driving an ink ejecting operation in the head) for the adjustment target head may be altered from other head driving voltages to control the dot diameter of ink droplets, for example. Also, the head may be moved up/down to change the flight distance of ink droplets upon ejection in order to control the dot diameter, for example. Alternatively, gradation may be adjustably set for each head by image processing. Further, other adjustment methods may be used to adjust gradation and density of a head.

In step S26, the printing system 1 prints a color check image (color check gradation chart) reflecting the setting change based on the adjustment value that is used for acquiring color information for each gradation when the setting change based on the adjustment value is implemented.

In step S27, the calorimeter 5 measures the colors of the color check gradation chart reflecting the adjustment for each head that has been output in step S26 to acquire color information.

In step S28, if the information processing apparatus 3 determines that the color difference between heads in the color check image (color check gradation chart) measured in step S27 is less than a target color difference (acceptable color difference) (YES in step S28), the manual adjustment process is terminated. In this way, the adjustment value that has been obtained is reflected, and color information is acquired from the adjusted image to determine whether readjustment is necessary.

If the color difference between the heads is greater than the target color difference such that readjustment is necessary (NO in step S28), the process returns to the adjustment value setting step (step S23) for obtaining the adjustment value and repeats the adjustment process until a positive determination (YES) is made in step S28.

Note that although the determination of whether to repeat adjustment is made based on a specific target color difference in the above-described step S28, in other examples, the operator 6 may determine whether to repeat adjustment based on a visual comparison of the color check image (color check gradation chart) printed after adjustment and the color adjustment image (color adjustment gradation chart) printed before adjustment, for example.

Also, note that although the color check image (color check gradation chart) is output again after readjustment in the present example, in a case where all the head-to-head color differences are determined to be less than the target color difference in step S33 of FIG. 9 as described below, the process flow may be ended without setting up a new adjustment value in the manual adjustment value setting step S23 of FIG. 8 and without outputting the color check gradation chart as indicated by the dotted line in FIG. 8, for example.

Figure 9:
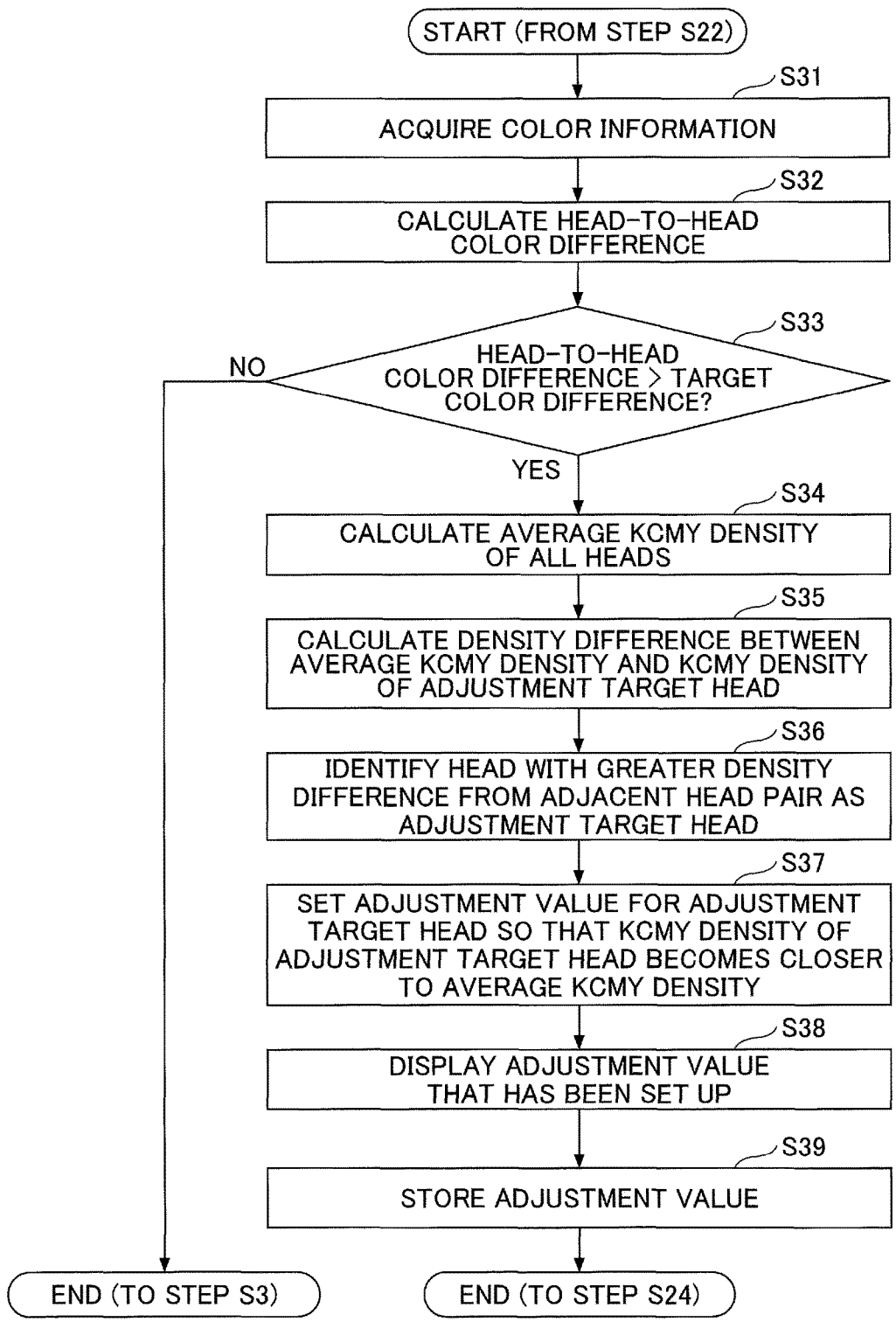
FIG. 9 is a flowchart illustrating a process flow for setting a manual adjustment value for a primary color in the information processing apparatus according to a first embodiment of the present invention.

Adjustment Value Calculation for Primary Color by Information Processing Apparatus FIG. 9 is a flowchart illustrating a detailed process flow of the process of setting a manual adjustment value for a primary color that is implemented by the information processing apparatus 3 in step S23 of FIG. 8. FIG. 9 illustrates the process flow for setting the manual adjustment value for a primary color that is implemented by the information processing apparatus 3 according to the first embodiment of the present invention.

FIG. 10 illustrates a colorimetric value acquisition table for indicating colorimetric values obtained with respect to multiple sections (positions) for each head that is displayed on the information processing apparatus 3 when the color adjustment target is a primary color. FIGS. 11A-11C are tables indicating values calculated for setting an adjustment value for adjusting a primary color. FIG. 11A indicates head-to-head color differences between adjacent heads, FIG. 11B indicates a density difference between an average head density and the density of each head, and FIG. 11C indicates KCMY density adjustment values set up for adjustment target heads that have been identified.

Note that the colorimetric values (L*a*b* values) include an L value indicating the apparent density and a* and b* values indicating hue differences. With respect to the colors K, C, M, and Y, which are primary colors generated using one type of ink, the hue differences (a* value, b* value) would be the same if the same ink is used, and as such, the density may be adjusted when performing color adjustment with respect to a primary color.

Thus, as illustrated in FIGS. 9 and 11A-11C, in the color adjustment determination method for determining which head should be adjusted in adjusting each of the primary colors K, C, M, and Y, the colorimetric value (L*a*b* values) may be used to determine whether adjustment is necessary, and the KCMY density may be used to calculate the adjustment values for the adjustment target heads.

In a step of acquiring colorimetric values, as illustrated in FIG. 10, color information for each gradation may be acquired with respect to each section of an image formed by each head that is included in a head column made up of heads in the colors K, C, M, and Y, for example.

FIGS. 11A-11C illustrate an example where an adjustment value is set up by obtaining an average value for each head by averaging the values for the multiple sections of the head and using the obtained average value as a desired target color for a specific gradation.

In the example adjustment value calculation process flow illustrated in FIG. 9, the average color information (KCMY density) of all the heads is used as the target color corresponding to a target value for adjustment.

In step S31, the colorimetric value acquisition unit 301 of the information processing apparatus 3 (see FIG. 5) acquires the color information detected by the colorimeter 5 for each gradation (colorimetric value acquisition step, density acquisition step). In a preferred embodiment, when the information processing apparatus 3 acquires color information, values detected and output by the colorimeter 5 with respect to the color adjustment gradation chart are automatically transmitted and imported to the information processing apparatus 3. Alternatively, the operator 6 may manually input the measured values obtained by the colorimeter 5 to the information processing apparatus 3. In step S31, colorimetric values (L*a*b* values) and the density (KCMY density) for each head of a plurality of heads in the colors K, C, M, and Y are acquired as color information. As described above, the density (KCMY density) does not necessarily have to be acquired through measurement and may alternatively be calculated based on the colorimetric values.

For example, the information processing apparatus 3 may display the acquired values of each color (K, C, M, Y) that have been transmitted thereto from the colorimeter 5 or manually input by the operator 6 in a table as illustrated in FIG. 10.

In step S32, the color difference calculation unit 302 of the information processing apparatus 3 calculates color differences between adjacent heads (pair) based on the calorimetric values. Note that adjacent heads refer to heads arranged next to each other in a direction orthogonal to the conveying direction of the recording medium, such as heads H1Y and H2Y in FIG. 3. For example, the information processing apparatus 3 may display the calculated color differences between adjacent heads in a table as illustrated in FIG. 11A. Note that the table of FIG. 11A indicates color differences obtained with respect to a gradation of 60% of the different gradations levels indicated in FIG. 10 as an example.

The color difference indicated in FIG. 11A corresponds to the total color difference DE representing the distance between two points on the L*a*b* color space.

The color difference $\Delta E$ is defined by the equation $\Delta E = [(\Delta L^*)2+(\Delta a^*)2+(\Delta b^*)2]1/2$.

Note that although the color difference $\Delta E$ is described as $\Delta E^*ab$ based on the L*a*b* color space in the present embodiment, the color difference $\Delta E$ may alternatively be $\Delta E^*uv$ based on L*u*v values where $\Delta E^*uv=[(\Delta L^*)2+(\Delta u^*)2+(\Delta v^*)2]1/2$, for example.

In step S33, the color difference/primary color target color difference comparison unit 304 of the information processing apparatus 3 compares the color differences between the adjacent heads with the target color difference (acceptable color difference). For example, assuming a target color difference of 1.5 is stored in the primary color target color difference storage unit 303 of the information processing apparatus 3, the color difference between heads H1Y and H2Y of the yellow (Y) recording heads and the color difference between heads H4C and H5C of the cyan (C) recording heads that are underlined and highlighted in the color difference table of FIG. 11A exceed the primary color target color difference. Thus, these pairs of heads (i.e., H1Y and H2Y, H4C and H5C) are identified as manual adjustment target candidate head pairs (heads that are determined to require adjustment) and the process proceeds to a manual adjustment step.

Note that step S33 corresponds to a determination step for determining whether adjustment of a head is necessary based on the calculated color differences. If at least one head-to-head color difference among the calculated head-to-head color differences is greater than the target color difference (YES in step S34), the process proceeds to step S34.

On the other hand, if all the calculated head-to-head color differences are less than the target color difference (NO in step S33), the process proceeds to step S3 of FIG. 6 without performing the subsequent manual adjustment process steps and the entire color adjustment process is ended. In this way, the adjustment time can be reduced. Also, over-adjustment can be avoided.

In step S34, the information processing apparatus 3 calculates an average colorimetric value of the colorimetric values of all the heads. More specifically, the density value acquisition unit 311 of the information processing apparatus 3 acquires the KCMY densities measured by the colorimeter 5 for all the heads from the color adjustment image (color adjustment gradation chart) output by the heads, and the density average value calculation unit 312 calculates an average KCMY density of the KCMY densities for all the heads.

In step S35, the density difference calculation unit 313 of the information processing apparatus 3 calculates a density difference between the density of each head and the average density of all the heads (density difference calculation step). For example, the information processing apparatus 3 may display the density differences between the KCMY densities of the respective heads and the average KCMY density of the entire print region of all the heads (corresponding to a target color) in a table such as that illustrated in FIG. 11B.

Note that although the table of FIG. 11B indicates the density difference between the KCMY density of each head and the average KCMY density, in some embodiments, the density difference calculation unit 313 may only compare the KCMY densities of the adjustment target candidate head pairs identified in step S33 with the average KCMY density, for example. Also, although the density difference of each head is calculated based on the average density in the above-described example, the difference in colorimetric values may be calculated instead of the density difference in other examples.

In step S36, the adjustment target identification unit 314 of the information processing apparatus 3 identifies an adjustment target head by determining the head with a greater density difference from among the heads of the adjustment target candidate head pair (head determination step). Specifically, the adjustment target identification unit 314 compares the density differences between the average density (the average KCMY density in the present example) and the densities (KCMY density) of the heads of the adjustment target candidate head pair to determine the head with the greater density difference with respect to the average density. The adjustment target identification unit 314 then selects the head with the greater density difference with respect to the average density as an adjustment target head to be adjusted. Also, as described above, the adjustment target head may alternatively be selected based on the differences in colorimetric values, for example.

In the example illustrated in FIG. 11B, by comparing the values (density differences) of heads H1Y and H2Y of the yellow (Y) recording heads, it can be appreciated that the value of head H2Y (0.018) is further away from 0 (average KCMY density) as compared to the value of head H1Y (0.002). Also, by comparing the values of heads H4C and H5C of the cyan (C) recording heads, it can be appreciated that the value of head H5C (−0.022) is farther away from 0 as compared with the value of head H4C (0.021). Thus, the head H1Y of the yellow (Y) recording heads and the head H5C of the cyan (C) recording heads that are underlined in FIG. 11B are identified (selected) as adjustment target heads.

Note that by adjusting the head with the greater density difference (or colorimetric value difference) to output a color closer to the target color, adjustment to the target color may be achieved with a smaller number of repetitions, for example.

In step S37, the adjustment value setting unit 315 of the information processing apparatus 3 sets up an adjustment value for the adjustment target head that has been identified (selected) such that the measured density for the adjustment target head becomes closer to the average density.

Then, in step S38, the display device 35 of the information processing apparatus 3 displays the adjustment value for the adjustment target head that has been set up by the adjustment value setting unit 35 in a table such as that illustrated in FIG. 11C, for example. Note that adjustment value is displayed such that the adjustment target head, the adjustment target color, and the adjustment direction can be discerned. Also, note that in some embodiments, the adjustment value that has been set up may be directly output to the printing system 1 of the DFE 2 by the output unit 31 of the information processing apparatus, for example.

In step S39, the head adjustment value (KCMY density) is stored and the process is terminated.

In this way, a head-to-head color difference is compared with a target color difference, and if the head-to-head color difference is less than the target color difference, color adjustment is ended, whereas if the head-to-head color difference is greater than the target color difference, an adjustment value is recalculated and the adjustment steps are repeated.

Note that in the example process flow of FIG. 9 for performing manual color adjustment, adjustment is performed with respect to each head as the adjustment unit. However, the adjustment unit to which manual color adjustment according to the present embodiment is applied is not limited each head but may be applied to some other arbitrary adjustment unit.

For example, in a case where the average colorimetric value of a plurality of colorimetric values of a plurality of sections of a head is used for calculating the color difference and determining an adjustment target, a section to be adjusted may be selected based on whether color differences between the sections is greater than a target color difference, and only the section with a color difference greater than the target color difference may be subjected to adjustment.

Note that in the examples illustrated in FIGS. 9 and 11A-11C, the KCMY density of the average color of the color adjustment image is used as the adjustment target color upon performing color adjustment. According to such control example, when there is a color that substantially deviates from the adjustment target color, the color may be adjusted to be closer to the average color, and in this way, each adjustment section may be properly adjusted without the occurrence of a non-adjustable section, for example.

However, the adjustment target color to be used upon adjusting color unevenness is not limited to the above. For example, the maximum or minimum colorimetric value (the lightest point or the darkest point) of an entire print region may be calculated and the corresponding KCMY density may be used as the adjustment target color. In this way, an image may be prevented from becoming too light or too dark when using lightness or density.

Further, in some cases, a specific color may be designated as an adjustment target color upon adjusting color unevenness. For example, assuming a specific color is to be continuously printed in a national flag, a company name, a catch phrase, or the like, the KCMY density may be adjusted to be close to the specific color. In this way, color adjustment may be more easily and efficiently implemented upon printing an actual image, for example. In this case, the specific color may be stored in advance, and the KCMY density of the specific color corresponding to the adjustment target color may be called in step S34, and the difference between the KCMY density of the specific color and the KCMY density of each head may be calculated in step S35, for example.

Note that in the case of adjusting a primary color, the relative density is preferably used when using the density of the average color, the maximum density corresponding to the lightest color, and the minimum density corresponding to the darkest color. In the case of using the density of a specific color, the absolute density is preferably used.

Also, note that although FIGS. 11A-11C illustrate an example case of performing adjustment with respect to a predetermined gradation level, the determination of whether adjustment of each head is necessary is preferably performed with respect to each of a plurality of gradation levels. However, in some embodiments, an image of only a predetermined gradation level may be output as the color adjustment image instead of a gradation chart including a plurality of gradation levels, and a determination of whether color adjustment is necessary may be made based on such image, for example.

The color adjustment method described above is implemented in the case of performing color adjustment with respect to a primary color. However, in the case of performing color adjustment with respect to a secondary color, adjustment cannot be based on density or brightness, and as such, it is more difficult to simply rely on adjustment through automatic detection using a scanner, for example. That is, there is a higher need to rely on manual adjustment to properly adjust the color tone of a secondary color.

Also, in the case of performing color adjustment of a secondary color formed by two colors, it is necessary to determine which of the colors constituting the secondary color is to be adjusted and the extent of adjustment to be made, for example. As such, manual adjustment of a secondary color further increases in complexity as compared with the case of manually adjusting a primary color. In this respect, according to an embodiment of the present invention, color adjustment of a secondary color may be executed in the following manner.

Secondary Color Adjustment

In the following, color adjustment of a secondary color is described as a second embodiment (second control example) of the present invention.

Figure 12:
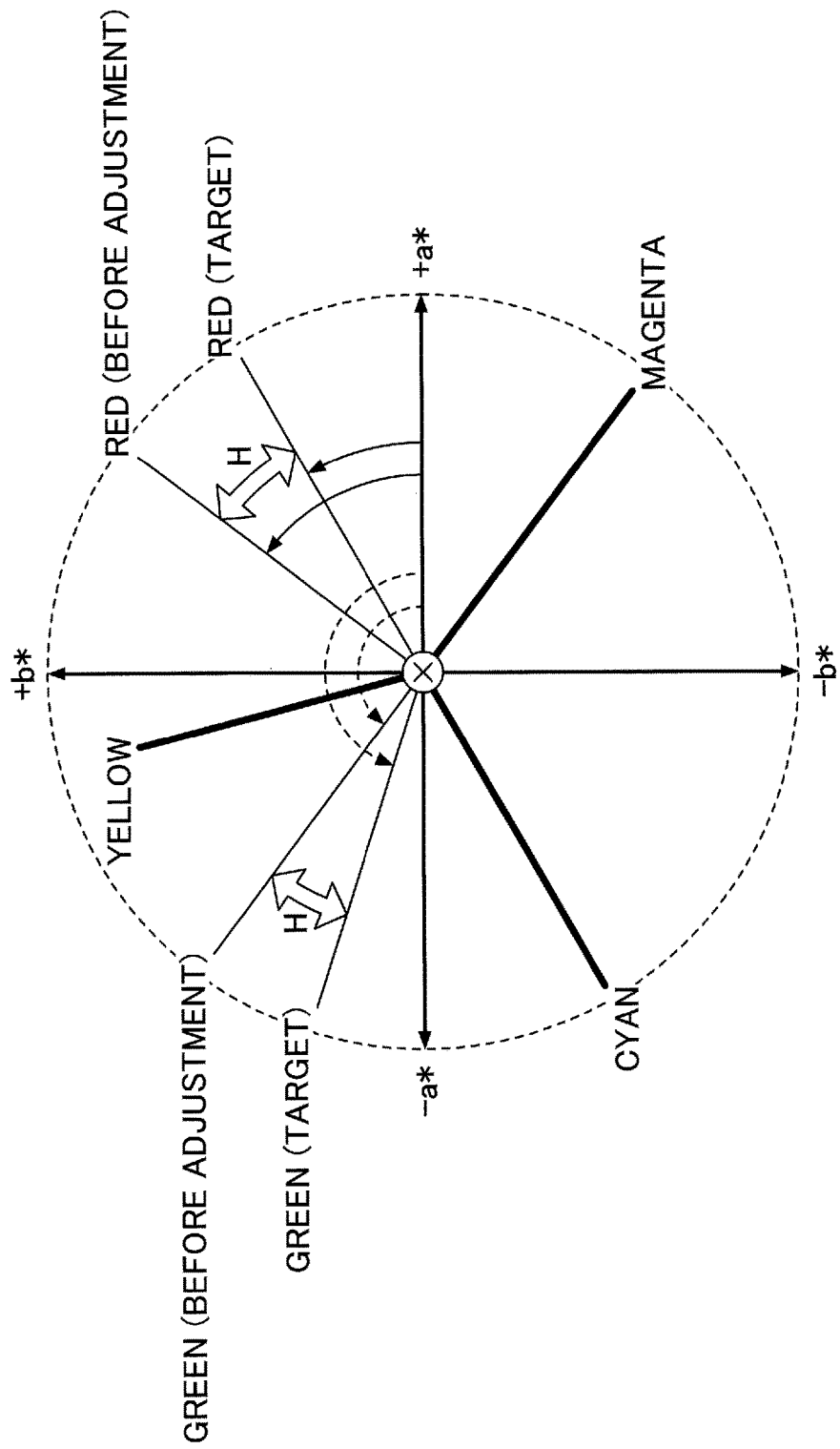
FIG. 12 is a conceptual view of adjustment using a hue angle of a secondary color.

FIG. 12 is a conceptual view of adjustment of a secondary color using a hue angle.

In the L*a*b* color space (also referred to as the CIELAB color space), the L* axis is the lightness axis representing lightness, where a value close to 0 represents black, and a value close to 100 represents white. The a* axis represents the green-red opponent color, where a negative value represents green, and a positive value represents red. The b* axis represents the blue/yellow opponent color, where a negative value represents blue, and a positive value represents yellow. For both the a* axis and the b* axis, the greater the numerical value, the higher the color intensity (saturation).

As described above, the color difference ΔE corresponding to the total color difference represents the distance between two points on a uniform color space, such as the L*a*b* color space.

In the color adjustment according to the present embodiment, it is assumed that a secondary color not using black is subjected to color adjustment, and as such, the lightness L may be assumed to be equal and adjustment is performed using a hue angle difference ΔH.

For example, in the CIELAB color space, hue angle "hab" can be obtained by the following equation: hab=$\tan^{-1}$(b*/a*) [degrees]. The hue angle "hab" represents the angle from the +a* axis of the CIELAB color space. FIG. 12 illustrates example hue angles in the CIELAB color space.

On the other hand, in the CIELUV color space, hue angle "huv" can be obtained by the following equation: huv =$\tan^{-1}$(v*/u*) [degrees]. The hue angle "huv" represents the angle from the +u* axis of the CIELUV color space.

The hue angle difference as described above may be used to adjust the balance between two colors of ink ejected onto the recording medium P acting on the a* and b* values of the CIELAB color space, for example. In the following, color adjustment based on the hue angle in the CIELAB color space will be described.

Secondary Color Manual Adjustment Process Flow

Figure 13:
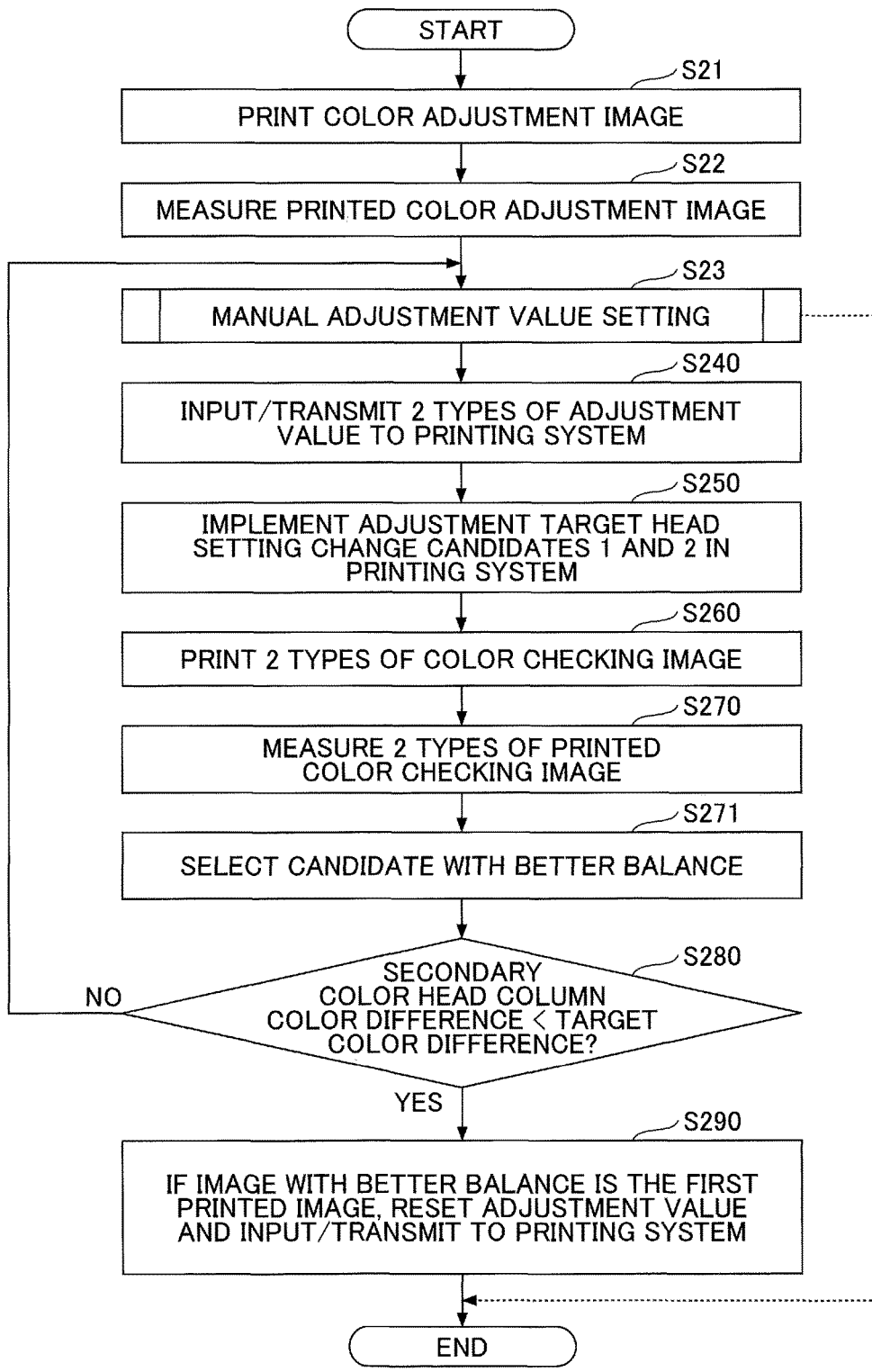
FIG. 13 is a flowchart illustrating manual adjustment of a secondary color.

FIG. 13 is a flowchart illustrating a schematic process flow of a secondary color manual adjustment process according to the second embodiment (second control example) of the present invention.

In the present embodiment, the color adjustment image (color adjustment gradation chart) subject to adjustment determination is in a secondary color (R, G, B) rather than a primary color (K, C, M, Y). As such, the process flow of FIG. 13 differs from the process flow of FIG. 8 in that it includes steps S240-S270 in place of steps S24-S27 and additionally includes steps S271-S290. More specifically, upon setting an adjustment value in steps S240 and S250, two types of adjustment value candidates are set up, and in step S260, color checking images reflecting these two types of adjustment value candidates are printed (output). In step S270, the two types of color checking images are measured, and in step S271, the color checking image that has smaller color differences (better balance) is selected. Note that further differences between the first embodiment and the second embodiment are described below with reference to FIG. 14.

The color adjustment image (color adjustment gradation chart) used in the present embodiment may have a layout similar to that illustrated in FIG. 7A. In the present embodiment, color adjustment gradation charts in three colors, R (red), G (green), and B (Blue), as examples of secondary colors, are output. It is assumed that the RGB color adjustment gradation charts are patterns in the secondary colors R, G, and B having primary colors contained at the same ratio. Note that a color adjustment gradation chart in a secondary color may also have a configuration as illustrated in FIG. 7B including horizontal rows representing the same gradation information of the original image data. Also, the color adjustment image includes vertical columns corresponding to regions formed by a plurality of head columns HC1, HC2, HC3, HC4, and HC5 that are aligned in the horizontal direction.

In the following, calculation of the two types of adjustment values to be output is described with reference to FIG. 12. Based on a relationship between a hue angle before adjustment and a target hue angle, a determination may be made as to which color among a first primary color and a second primary color forming a secondary color is to be assigned the value "+" as an adjustment value.

For example, FIG. 12 illustrates a hue angle before adjustment and a target hue angle of red, as an example of a secondary color that is produced on a recording medium by inks of primary colors yellow and magenta. In the present example, it is assumed that the hue angle before adjustment of red is closer to yellow as compared with the target hue angle. That is, it is assumed that the hue angle before adjustment is greater than the target hue angle.

In this case, the hue angle is desirably adjusted to be closer to magenta. Thus, in setting an adjustment value, two types of adjustment values including the value "+" for magenta (to increase the ratio of magenta) and the value "−" for yellow (to increase the ratio of yellow) are set up as adjustment value candidates, and two types of color checking gradation charts including a color checking gradation chart with the value "+" set up as the adjustment value for magenta and a color checking gradation chart with the value "−" set up as the adjustment value for yellow are output.

In the case of using a secondary color, it is often difficult to determine which color of the two primary colors constituting the secondary color should be adjusted even when the adjustment direction of the hue angle can be calculated. Thus, to obtain a color close to a predetermined color, both a case where the value "+" is set up as an adjustment value for a first primary color and a case where the value "−" is set up as an adjustment value for a second primary color can be tested. In this way, a desirable adjustment value may be more accurately obtained, for example.

Note that although an example case where color checking gradation charts are output again after step S240 of FIG. 13 is described above, when all the head-to-head color differences are less than a target color difference in step S43 of FIG. 14 (described below), new adjustment values may not be set up in the manual adjustment value setting process of step S23 and the process flow of FIG. 13 may be ended without outputting color checking gradation charts as indicated by the dotted line in FIG. 13, for example.

Also, in determining which color among the first primary color and the second primary color forming the secondary color is to have an adjustment value set the value "+", hue angle information of inks in the individual colors may be stored beforehand, and the adjustment value may be set up such that the ink in the primary color closer to the target hue angle than the hue angle before adjustment is increased in ratio, for example. Note, however, that in the case of the color red, for example, it is known beforehand that magenta should be increased if the hue angle before adjustment is greater than the target hue angle. Thus, the ink ratio of the primary colors magenta and yellow may be adjusted without using the hue angle information of inks in the individual colors, for example.

Also, note that adjustment of the secondary color green illustrated in FIG. 12 is described below with reference to FIG. 16.

Figure 14:
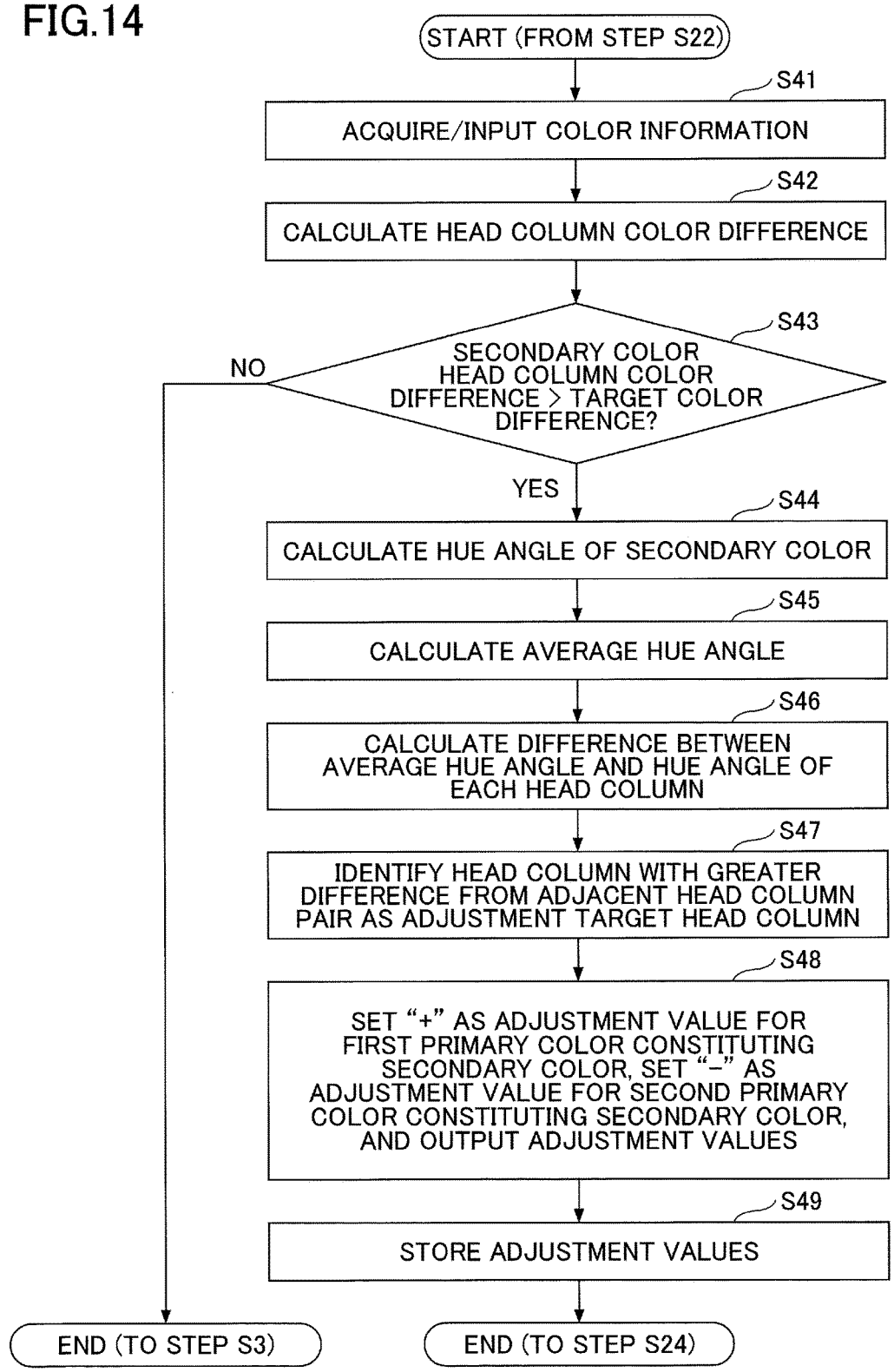
FIG. 14 is a flowchart illustrating a process flow for setting a manual adjustment value for a secondary color in the information processing apparatus according to a second embodiment of the present invention.

Calculation of Secondary Color Adjustment Value by Information Processing Apparatus FIG. 14 is a flowchart illustrating an example process flow for calculating a secondary color manual adjustment value in the information processing apparatus 3 according to the second embodiment of the present invention.

FIG. 15 is a table indicating colorimetric values obtained for multiple sections of a head that is displayed by the information processing apparatus 3 when a secondary color is subject to color adjustment. FIGS. 16A-16C are tables indicating values calculated for setting an adjustment value for a secondary color that are displayed by the information processing apparatus 3. FIG. 16A indicates hue angle differences between head columns, FIG. 16B indicates a difference between an average hue angle and the hue angle of each head column, and FIG. 16C indicates an adjustment value (adjustment direction) set up for an adjustment target head column.

In a step of acquiring colorimetric values, color information for each gradation is acquired for each section of an image formed by each head column as illustrated in FIG. 15. FIGS. 16A-16C illustrate an example of setting an adjustment value using an average value for each head column obtained by averaging the values for the sections of the head for a specific gradation.

In step S41 of FIG. 14, the colorimetric value acquisition unit 301 (see FIG. 5) of the information processing apparatus 3 acquires calorimetric values (L*a*b* values) as color information detected by the colorimeter 5 (acquisition step). For example, the information processing apparatus 3 may display colorimetric values (L*a*b* values) and KCMY densities corresponding to measured values acquired for each of the secondary colors R, G, and B (transmitted or manually input to the information processing apparatus 3) in a table as illustrated in FIG. 15, for example. Note that in the present embodiment, the KCMY density information does not have to be acquired, but it may be used for color adjustment in step S48 of FIG. 14 as described below.

In step S42, the color difference calculation unit 302 of the information processing apparatus 3 calculates a color difference between adjacent head columns (color difference calculation step). Note that adjacent head columns are head columns arranged next to each other in a direction orthogonal to the recording medium conveying, such as head columns HC1 and HC2 in FIG. 3. For example, with respect to the printing system 1 that uses five head columns HC1 to HC5, the information processing apparatus 3 may display color differences LE between the head columns obtained for the secondary colors R, G, and B in a table as illustrated in FIG. 16A.

The secondary colors are formed by ejecting ink from a plurality of heads of a head column that are aligned in the recording medium conveying direction. Thus, when making an adjustment determination based on a secondary color, a color difference between images formed by different head columns is used. The color difference between images formed by a plurality of head columns may be referred to as color difference between head columns.

In step S43, the color difference/secondary color target color difference comparison unit 306 of the information processing apparatus 3 compares the color difference between head columns and a target color difference.

In FIG. 16A, for example, ΔE<2.5 may be stored in the secondary color target color difference storage unit 305 as the target color difference between head columns. In this case, the color difference between head columns HC3 and HC4 and the color difference between head columns HC4 and HC5 that are underlined and highlighted in FIG. 16A are pairs of head columns having a color difference greater than the target color difference ΔE. These pairs of head columns (HC3 and HC4, HC4 and HC5) are identified as pairs of adjustment target head column candidates for manual adjustment.

In step S43, a determination is made as to whether adjustment of a head column is necessary based on the color differences between head columns. If at least one color difference between head columns of the calculated color differences between head columns is greater than the target color difference (YES in step S43), that is, if there is a pair of head columns to be manually adjusted, the process proceeds to step S44.

On the other hand, if all the color differences between head columns is less than the target color difference (NO in step S43), the process proceeds to step S3 of FIG. 6 without performing the subsequent manual color adjustment process steps and the overall color adjustment process is ended.

In the case where a positive determination (YES) is made in step S43, in step S44, the hue angle calculation unit 321 of the information processing apparatus 3 calculates the hue angle of the secondary color formed by each of the head columns HC1 to HC5 using inks of plural primary colors (hue angle acquisition step).

Then, in step S45, the hue angle average value calculation unit 322 calculates an average hue angle of all the hue angles obtained for a predetermined secondary color formed by the head columns HC1 to HC5.

Then, in step S46, the hue angle difference calculation unit 323 obtains the difference between the average hue angle and the hue angle of each head column (hue angle difference calculation step). For example, the information processing apparatus 3 may display a hue angle difference ΔH obtained for each head column by calculating the difference between the secondary color average hue angle (corresponding to the target color) and the hue angle of the secondary color formed by each head column in a table as illustrated in FIG. 16B.

In step S47, the adjustment target head column identification unit 324 selects a head column that has a greater hue angle difference with respect to the average hue angle from among the pair of head columns identified as manual adjustment target candidates and identifies the selected head column as the adjustment target head column to be adjusted (head column determination step).

For example, referring to the table of FIG. 16B, by comparing the hue angle differences of the manual adjustment target candidate head column pairs for green (G), it can be appreciated that between head columns HC3 and HC4, the head column HC4 has a greater hue angle difference with respect to the average hue angle, and between head columns HC4 and HC5, the head column HC4 has a greater hue angle difference with respect to the average hue angle. Thus, in this example, a plurality of heads included in the head column HC4 (underlined in FIG. 16B) that form the secondary color green (G) are the adjustment target heads to be adjusted.

Note that in the above example, the hue angle of green (G) in the image formed by the head row HC4 is less than the average hue angle (target hue angle) as illustrated in FIG. 12. That is, the hue angle of green (G) before adjustment is closer to yellow (Y). Thus, the value "+" is set up as the adjustment value (adjustment direction) for green (G) in the table of FIG. 16C so that the plurality of heads included in the head column HC4 that form the color green (G) are adjusted to form the color green (G) at a hue angle closer to the average hue angle. Note that the adjustment value "+" indicating the adjustment direction in FIG. 16C means that the angle from the +a* axis is to be increased. That is, the adjustment value "+" for the color green in FIG. 16C means that the ratio of cyan ink among the yellow and cyan inks forming the color green is to be increased.

As described above, in step S47, the plurality of heads of the head column to be adjusted and the adjustment direction are determined.

In step S48, the adjustment value setting unit 325 sets up two different types of adjustment values for heads ejecting inks in first and second primary colors forming a secondary color, including the value "+" for the head ejecting ink in the first primary color and the value "−" for the head ejecting ink in the second primary color, and outputs the two types of adjustment values as adjustment value candidates. Based on the adjustment value candidates set up by the adjustment value setting unit 325, steps S240 to S260 of FIG. 13 are executed to output two types of color checking images (color checking gradation charts), including a color checking gradation chart with the adjustment value for the head ejecting the first primary color ink set to "+" and a color checking gradation chart with the adjustment value for the head ejecting the second primary color ink set to "−".

For example, to increase the hue angle of the secondary color green (G) that is formed by the head column HC4 as indicated by the adjustment value "+" in FIG. 16C, the adjustment value for cyan ink may be set to "+" or the adjustment value for yellow ink may be set to "−" as can be appreciated from FIG. 12. For example, it is assumed below that of the primary colors cyan and yellow forming the secondary color green, cyan that is closer to the target hue angle of the target color ("GREEN (TARGET)") than the hue angle before adjustment ("GREEN (BEFORE ADJUSTMENT)") in FIG. 12 is the first primary color and the color yellow that is closer to the hue angle before adjustment is the secondary primary color. Further, it is assumed below that the head H4C of the head column HC4 is a first head for ejecting ink in the first primary color (cyan) that is closer to the target hue angle of the target color, and the head H4Y of the head column HC4 is a second head for ejecting ink in the second primary color (yellow) that is closer to the hue angle of the color before adjustment.

In this case, a first color checking image in which the ejection amount of the head H4C ejecting the first primary color (cyan) ink is increased and a second color checking image in which the ejection amount of the head H4Y ejecting the second primary color (yellow) is decreased are to be output as the two types of color checking images. Thus, the adjustment value "+" set up for the first head ejecting the first primary color ink and the adjustment value "−" set up for the second head ejecting the second primary color ink are output as adjustment value candidates in step S48. Note that the extent of change (adjustment) to be made with respect to the first and second heads respectively ejecting inks in the first and second primary colors may be determined in any manner. For example, the change may be made based on the magnitude of the hue angle difference. Also, the smallest amount of change may be used in making the change (adjustment), for example.

Then, in step S240 of FIG. 13, the two types of adjustment values for outputting the two types of color checking gradation charts are transmitted or input to the printing system 1 as adjustment value candidates. In step S250, setting changes are made to implement color adjustment reflecting the two types of adjustment value candidates. Then, in step S260, the two types of color checking gradation charts are printed (color checking image formation step).

In step S270, the two types of color checking gradation charts are measured, and color differences between head columns are obtained.

Then, in step S271, the operator 6 or the information processing apparatus 3 selects the color checking image with smaller color differences between head columns (better balance) from among the two types of color checking images.

In step S280, color differences between head columns acquired from the selected color checking image and the target color difference between head columns are compared, and if all the color differences are less than the target color difference, color adjustment is ended. Note that steps S270, S271, and S280 of FIG. 13 correspond to an example of a secondary color adjustment head determination step for determining which head among the first head (cyan head H4C in the example of FIGS. 16A-16C) and the second head (yellow head H4Y in the example of FIGS. 16A-16C) of a predetermined head column (head column HC4 in the example of FIGS. 16A-16C) is to be an adjustment target head to be adjusted.

In this way, the color differences between head columns and the target color difference are compared, and if all the color differences are less than the target color difference, color adjustment is ended. On the other hand, if there is a color difference that is greater than the target color difference, adjustment values are recalculated in step S23 and subsequent color adjustment process steps are repeated.

As can be appreciated from the above, when it is difficult to determine which head among a plurality of heads ejecting inks in different colors should be adjusted, a plurality of color checking images using a plurality of adjustment value candidates may be output and examined to more accurately determine the suitable adjustment value. Also, in the case of adjusting a secondary color, a more visually uniform image can be obtained by determining the adjustment value based on the hue angle.

Note that in the case where the color checking gradation chart with the better balance (smaller color differences between head columns) corresponds to the color checking gradation chart that has been printed first, in step S290, the adjustment value setting in the printing system 1 may be reset to the first adjustment value setting change that has been implemented in step S250, and the manual color adjustment process may be ended thereafter, for example.

As described above, in the case of adjusting a secondary color, it is difficult to accurately determine the color difference based on color density, and as such the hue angle is preferably used to determine the color difference. Also, the adjustment amount for adjusting a color to the target color may be determined based on a calibration curve obtained by linearly interpolating color characteristics for each gradation, or the adjustment amount may be adjusted based on gradation steps, for example.

Note that although FIG. 14 illustrates an example where the average hue angle is used as the target color and a color is adjusted to be closer to the average hue angle, in other examples, the maximum value or the minimum value of the colorimetric values may be used as a target color value.

Alternatively, the target color may be set to a hue angle corresponding to a specific color. In this case, the specific color and its hue angle are stored in advance, and the hue angle of the specific color corresponding to the target color may be called in step S45, for example. Then, in step S46, the difference between the hue angle of the specific color and the hue angle of each head may be calculated, for example.

Also, note that in order to keep the gray balance constant regardless of the gradation, the target hue angle is preferably selected from a combination closest to $a^*=b^*=0$, or the hue angle is adjusted to a target tone of gray, for example.

Also, note that although FIGS. 16A-16C illustrate an adjustment made with respect to a predetermined gradation, the determination of whether color adjustment of a head column is necessary is preferably made with respect to each of a plurality of gradations. However, in some embodiments, instead of using a gradation chart including a plurality of gradation images, an image with only a predetermined gradation may be output and the determination of whether color adjustment of a head column is necessary may be made using such image as a color adjustment image.

As described above, by using the hue angle as color information in the case of adjusting a secondary color, color tone that cannot be adjusted based on density or lightness may be adjusted, for example.

Also, in some embodiments, instead of using the hue angle difference, adjustment may be performed using the distance between two points on the $a^*b^*$ plane or the $u^*v^*$ plane, for example.

Note that although an example case of adjusting a secondary color using the hue angle is described above, the color adjustment determination method using the hue angle may also be implemented in adjusting a primary color or a tertiary color, for example.

Adjustment of Tertiary Color

Further, a given hue angle may be used as a target value in adjusting a tertiary color corresponding to a color produced by mixing three different colors of ink. As described above, the color adjustment determination method according to the second embodiment using a hue angle may also be applied to color adjustment of a tertiary color (e.g., composite black). Note that composite black may be adjusted based on the L* value or density, but composite black may also be adjusted by calculating and setting adjustment values based on the hue angle as with a secondary color.

In this way, colors formed by three or more primary colors may be adjusted while adjusting the gray balance.

Incorporation of Colorimeter into Printing System

In the above, a method of obtaining an adjustment value for manual adjustment has been described. However, if a calorimeter capable of measuring colorimetric values (L*a*b* values) and color density is provided in the printing system, an adjustment value may be calculated within the printing system upon performing automatic adjustment to accurately reflect color adjustment, for example.

Utilization of Multi-Stage Scanner in Printing System

As illustrated in FIG. 6 described above, in a color information acquisition process for automatic adjustment of step S1, scanning has to be performed at high resolution to scan each nozzle or each block of nozzles in order to detect density unevenness and nozzle defects within a head in adjusting color unevenness adjustment.

Because color differences between heads are relatively large, manual adjustment is performed to adjust the color differences between heads in the above-described embodiments. However, in some embodiments, instead of performing manual adjustment, the control unit 101 of the printing system 1 or the DFE 2 may perform color adjustment of the color differences between the heads by acquiring hue angles using scanners included in the image inspection mechanisms 140 and 180 (see FIG. 2) of the printing system 1, for example.

In this case, if processes corresponding to the automatic adjustment in step S1 of FIG. 6 and the manual adjustment in step S2 are simultaneously executed, a large amount of memory space may be required in order to simultaneously satisfy processing requests relating to two scanned images and further processing the entire width of a printing region, for example.

In this respect, one scanner capable of color measurement may be used and settings may be altered at two different stages to perform high resolution/low bit rate adjustment for adjusting nozzle defects, for example, followed by low resolution/high bit rate adjustment for color tone adjustment, for example. In this way, the scanner may be configured to be capable of making adjustments including color tone adjustment of a secondary color, for example.

Figure 17:
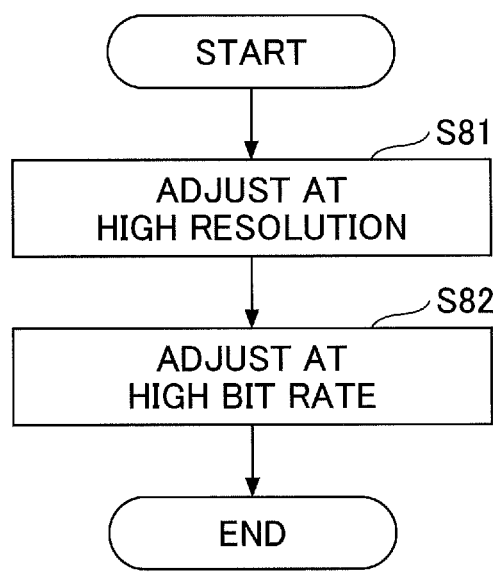
FIG. 17 is a flowchart illustrating a color adjustment method implemented in a printing system including a scanner having colorimetric capabilities.

FIG. 17 is a flowchart illustrating a schematic process flow of a color adjustment method implemented by the printing system that includes a scanner having colorimetric capabilities.

In step S81, high resolution/low bit rate adjustment such as adjustment of nozzle defects and color differences within a head is performed. That is, when adjusting color unevenness within a small section (e.g., streak adjustment), color information is scanned at a high resolution. Note that the high-resolution adjustment performed in step S81 may be substantially similar to typical automatic color unevenness adjustment for mainly adjusting nozzle defects and the like within a head.

In step S82, low resolution/high bit rate adjustment for adjusting a color tone (e.g., secondary color) is performed in order to calculate an adjustment value for adjusting a color difference between heads or a color difference between head columns. In the low resolution/high bit rate adjustment may be performed in a manner similar to the color adjustment method for adjusting a secondary color using a colorimeter as illustrated in FIGS. 14 to 160, for example.

By adjusting a color tone using a scanner that has undergone a setting change as described above, color adjustment that considers color characteristics including color tone may be performed using a scanner, which is less expensive than a colorimeter.

Other Modifications

Note that the above-described embodiments of the present invention are applied to a line head inkjet apparatus having a plurality of heads arranged in a direction orthogonal to a recording medium conveying direction. However the present invention may also be applied to a serial inkjet apparatus having heads moving with respect to a recording medium as long as a plurality of heads are arranged in a direction orthogonal to the moving direction of the heads. That is, the present invention is applicable to any apparatus having a plurality of heads arranged in a direction orthogonal to the relative moving direction of a recording medium and the heads.

Although the present invention has been described above with reference to certain illustrative embodiments, the present invention is not limited to these embodiments, and numerous variations and modifications may be made without departing from the scope of the present invention.

What is claimed is:

1. A color adjustment determination method comprising:
    forming a color adjustment image on a recording medium by ejecting liquid from a plurality of heads that are arranged in a line, each head of the plurality of heads including a plurality of nozzles;
    acquiring colorimetric values of at least two portions of the color adjustment image formed by the plurality of heads that are arranged at different positions in the line;
    calculating a color difference between the at least two portions of the color adjustment image based on the colorimetric values of the at least two portions of the color adjustment image; and
    determining whether adjustment of at least one of the plurality of heads that have ejected the liquid is required based on the calculated color difference.

2. The color adjustment determination method according to claim 1, wherein
    an acceptable color difference to be compared with the calculated color difference is stored in advance; and
    in determining whether adjustment of at least one of the plurality of heads is required, one of two heads of the plurality of heads that have formed two specific portions of the at least two portions of the color adjustment image is determined to require adjustment in a case where the calculated color difference between the two specific portions is greater than the acceptable color difference.

3. The color adjustment determination method according to claim 2, further comprising:
    acquiring density information of the color adjustment image;
    calculating a density difference between density information of a desired target color and the density information of the two specific portions of the color adjustment image that have been formed by the two heads; and
    determining which head from among the two heads is to be adjusted based on the calculated density difference.

4. The color adjustment determination method according to claim 3, wherein
    in determining which head from among the two heads is to be adjusted, the head among the two heads that has formed the portion from among the two specific portions having a greater density difference is determined to be the head to be adjusted.

5. The color adjustment determination method according to claim 3, wherein
    the density information of the desired target color is an average value of the density information of a region of the color adjustment image that has been formed by the plurality of heads and corresponds to original image data having the same gradation information.

6. The color adjustment determination method according to claim 1, wherein
    the plurality of heads form a plurality of head columns, each head column having more than one of the heads arranged in a relative moving direction;

the plurality of head columns are arranged in an orthogonal direction orthogonal to the relative moving direction; and the plurality of head columns eject liquids in different colors from more than one of the heads included in the plurality of head columns to form an image in a color formed by the liquids in the different colors on the recording medium.

7. The color adjustment determination method according to claim 6, wherein in forming the color adjustment image, the liquids in the different colors are ejected from more than one of the heads included in each of the plurality of head columns to form the color adjustment image in the color formed by the liquids in the different colors on the recording medium; and in calculating the color difference, a color difference between two portions of the color adjustment image formed by two head columns of the plurality of head columns that are arranged at different positions in the orthogonal direction is calculated.

8. The color adjustment determination method according to claim 7, wherein an acceptable color difference to be compared with the calculated color difference is stored in advance; and in determining whether adjustment of at least one of the plurality of heads is required, one of the two head columns that have formed the two portions of the color adjustment image is determined to require adjustment in a case where the calculated color difference between the two portions is greater than the acceptable color difference;

the color adjustment determination method further including acquiring a hue angle of the color adjustment image;

calculating a hue angle difference between a hue angle of a desired target color and a hue angle of each of the two portions of the color adjustment image formed by the two head columns; and determining the head column from among the two head columns that is to be adjusted based on the calculated hue angle difference.

9. The color adjustment determination method according to claim 8, wherein in determining which head column among the two head columns is to be adjusted, the head column from among the two head columns that has formed the portion from among the two portions of the color adjustment image having a greater hue angle difference is determined to be the head column to be adjusted.

10. The color adjustment determination method according to claim 9, further comprising:

forming, based on the hue angle, a first color checking image in which an ejection amount of a first head of the head column to be adjusted is increased and a second color checking image in which an ejection amount of a second head of the head column to be adjusted is decreased; wherein the first head and the second head correspond to the heads included in the head column to be adjusted that have ejected the liquids in the different colors to form the portion of the color adjustment image with the greater hue angle difference.

11. The color adjustment determination method according to claim 10, further comprising:

calculating the color difference for the first color checking image and the color difference for the second color checking image, and determining which head among the first head and the second head is to be adjusted based on the color differences calculated for the first color checking image and the second color checking image.

12. The color adjustment determination method according to claim 7, wherein the hue angle of the desired target color is an average value of hue angles of a region of the color adjustment image that has been formed by the plurality of head columns and corresponds to original image data having the same gradation information.

13. A color adjustment determination method comprising:

acquiring colorimetric values of at least two portions of a color adjustment image formed on a recording medium by ejecting liquid from a plurality of heads that are arranged at different positions in a line, each head of the plurality of heads including a plurality of nozzles;

calculating a color difference between the at least two portions of the color adjustment image based on the colorimetric values of the at least two portions of the color adjustment image; and determining whether adjustment of at least one of the plurality of heads that have ejected the liquid is required based on the calculated color difference.

14. A non-transitory computer-readable medium storing a program that, when executed, causes a computer to perform the color adjustment determination method according to claim 13.

15. An information processing apparatus comprising:

a processor; and a memory storing program instructions that cause the processor to implement processes of acquiring colorimetric values of at least two portions of a color adjustment image formed on a recording medium by ejecting liquid from a plurality of heads that are arranged at different positions in a line, each head of the plurality of heads including a plurality of nozzles;

calculating a color difference between the at least two portions of the color adjustment image based on the colorimetric values of the at least two portions of the color adjustment image; and determining whether adjustment of at least one of the plurality of heads that have ejected the liquid is required based on the calculated color difference.

* * * * *

UNITED STATES PATENT AND TRADEMARK OFFICE
CERTIFICATE OF CORRECTION

PATENT NO. : 10,477,074 B2
APPLICATION NO. : 16/254784
DATED : November 12, 2019
INVENTOR(S) : Yohsuke Konishi et al.

Page 1 of 1

It is certified that error appears in the above-identified patent and that said Letters Patent is hereby corrected as shown below:

On the Title Page

Item (30), the Foreign Application Priority Data Information has been omitted.
Item (30) should read as:
- Aug. 5, 2016 (JP) ........ 2016-155078
Jul. 18, 2017 (JP) ........ 2017-139326 -

Signed and Sealed this
Eleventh Day of February, 2020

Andrei Iancu
*Director of the United States Patent and Trademark Office*